US009582246B2

(12) United States Patent
Klein et al.

(10) Patent No.: US 9,582,246 B2
(45) Date of Patent: *Feb. 28, 2017

(54) VOICE-COMMAND SUGGESTIONS BASED ON COMPUTER CONTEXT

(71) Applicant: Microsoft Technology Licensing, LLC, Redmond, WA (US)

(72) Inventors: Christian Klein, Duvall, WA (US); Zach Johnson, Woodinville, WA (US); Matthew Fleming, Duvall, WA (US); Gregg Wygonik, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/602,155

(22) Filed: Jan. 21, 2015

(65) Prior Publication Data
US 2015/0254058 A1 Sep. 10, 2015

Related U.S. Application Data

(60) Provisional application No. 61/947,926, filed on Mar. 4, 2014.

(51) Int. Cl.
*G10L 15/00* (2013.01)
*G06F 3/16* (2006.01)
(Continued)

(52) U.S. Cl.
CPC .............. *G06F 3/167* (2013.01); *G10L 15/22* (2013.01); *H04N 21/4222* (2013.01); *H04N 21/42203* (2013.01); *H04N 21/4668* (2013.01); *H04N 21/478* (2013.01); *A63F 13/215* (2014.09); *A63F 13/424* (2014.09); *A63F 13/79* (2014.09); *G10L 2015/223* (2013.01); *G10L 2015/225* (2013.01); *G10L 2015/228* (2013.01)

(58) Field of Classification Search
CPC ......... G10L 15/22; G10L 15/26; G06F 3/167; H04M 2201/40
USPC .......................................... 704/231–257, 275
See application file for complete search history.

(56) References Cited

U.S. PATENT DOCUMENTS 6,424,357 B1 * 7/2002 Frulla ..................... G06F 3/038
715/716
6,762,692 B1 * 7/2004 Mingot ................... G10L 15/22
340/12.54
(Continued)

OTHER PUBLICATIONS

Claim set dated Jan. 20, 2015 in U.S. Appl. No. 14/600,884, 7 pgs.*
(Continued)

*Primary Examiner* — Jesse Pullias
(74) *Attorney, Agent, or Firm* — Gregg Wisdom; Judy Yee; Micky Minhas

(57) ABSTRACT

A contextual state of a graphical user interface presented via a display of the computing system is identified. A voice command is selected from a set of voice commands based on the contextual state of the graphical user interface. A context-specific voice-command suggestion corresponding to the selected voice command is identified. A graphical user interface including the context-specific voice-command suggestion is presented via a display.

16 Claims, 12 Drawing Sheets

(51) Int. Cl.
*G10L 15/22* (2006.01)
*H04N 21/422* (2011.01)
*H04N 21/466* (2011.01)
*H04N 21/478* (2011.01)
*A63F 13/215* (2014.01)
*A63F 13/79* (2014.01)
*A63F 13/424* (2014.01)

(56) References Cited

U.S. PATENT DOCUMENTS

| | | | |
|---|---|---|---|
| 9,190,074 B1* | 11/2015 | LeBeau | G10L 21/10 |
| 2004/0176958 A1* | 9/2004 | Salmenkaita | H04M 1/72561 |
| | | | 704/275 |
| 2008/0103781 A1* | 5/2008 | Wasson | G10L 17/26 |
| | | | 704/277 |
| 2010/0312547 A1 | 12/2010 | Van Os et al. | |
| 2011/0126154 A1* | 5/2011 | Boehler | G06F 3/0237 |
| | | | 715/811 |
| 2013/0227419 A1 | 8/2013 | Lee et al. | |
| 2013/0339345 A1 | 12/2013 | Soto Matamala et al. | |
| 2014/0039893 A1 | 2/2014 | Weiner | |

OTHER PUBLICATIONS

"Dragon Premium", Retrieved on: Feb. 20, 2014 Available at: http://shop.nuance.com/store/nuanceus/Custom/pbpage.resp-dragon-int-premium-pg-bundle.

King, Rachel, "Nuance's Dragon ID Unlocks Mobile Devices by Voice Command", Published on: Jun. 5, 2012 Available at: http://www.zdnet.com/blog/btl/nuances-dragon-id-unlocks-mobile-devices-by-voice-command/79106.

"Voice Shortcuts", Retrieved on: Feb. 20, 2014 Available at: http://news.xbox.com/~/media/images/media%20assets/xbox%20one/20131125%20kinect%20voice%20and%20gesture%20guide/xbox_one_kinect_voice_library_white_for_print.pdf.

Aguilar, Nelson, "How to Master Siri's New Voice Commands in iOS 7 & Make Her Do Whatever You Want", Retrieved on: Feb. 20, 2014 Available at: http://ios.wonderhowto.com/how-to/master-siris-new-voice-commands-ios-7-make-her-do-whatever-you-want-0148697/.

Orland, Kyle, "Hands-on with the Xbox One: Kinect, Interface, and OS Impressions", Published on: Nov. 8, 2013 Available at: http://arstechnica.com/gaming/2013/11/hands-on-with-the-xbox-one-kinect-interface-and-os-impressions/.

Hashmi, Saad, "New Multitasking and Speech APIs Announced for Developers", Published on: Jun. 20, 2012 Available at: http://windowsphonedaily.com/2012/06/new-multitasking-and-speech-apis.html#.UwW_vvmSz-s.

Hodgkins, Kelly, "A Long List of Jelly Bean Voice Commands for Your Galaxy Nexus, Nexus 7 and Other JB Devices", Published on: Jul. 28, 2012 Available at: http://www.intomobile.com/2012/07/28/long-list-jelly-bean-voice-commands/.

U.S. Appl. No. 13/956,145, Wheeler, et al., "System with Multiple Simultaneous Speech Recognizers", filed Jul. 31, 2013.

* cited by examiner

VOICE-COMMAND SUGGESTIONS BASED ON COMPUTER CONTEXT

CROSS-REFERENCE TO RELATED APPLICATIONS

This application claims priority to U.S. Provisional Application No. 61/947,926, filed Mar. 4, 2014 and entitled "VOICE CONTROL SHORTCUTS" the complete contents of which are hereby incorporated herein by reference for all purposes.

BACKGROUND

In multitasking computing systems that support launching and switching between multiple applications, interactions with an operating system may be slow and cumbersome. For example, launching an application may entail navigating hierarchical lists or searching a graphical user interface to find the application. Often a manual login or user switching step is performed prior to launching the application to ensure that the application displays an appropriate context.

SUMMARY

A contextual state of a graphical user interface presented via a display of the computing system may be identified. A voice command may be selected from a set of voice commands based on the contextual state of the graphical user interface. A context-specific voice-command suggestion corresponding to the selected voice command may be identified. A graphical user interface including the context-specific voice-command suggestion may be presented via a display.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
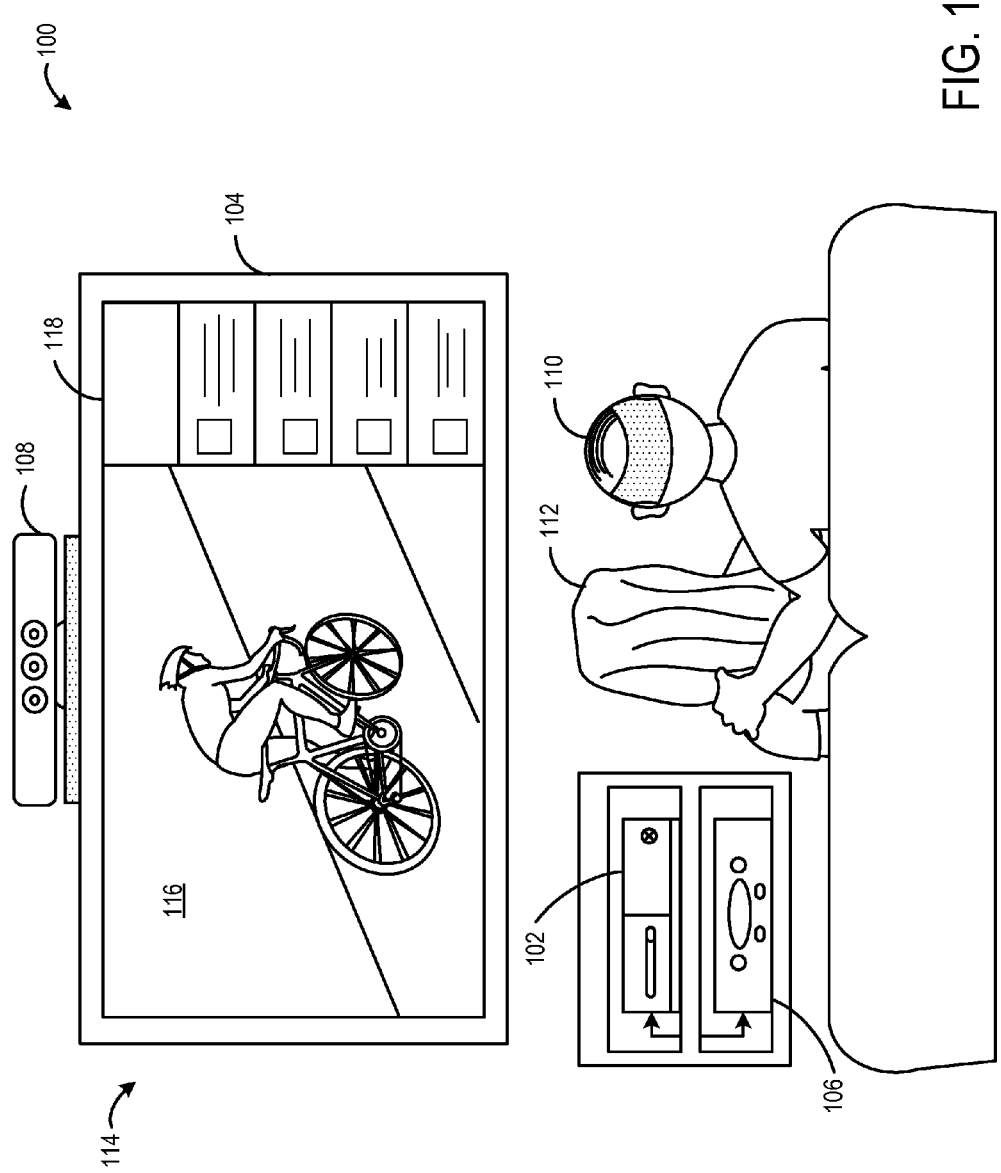
FIG. 1 shows an example entertainment environment.

FIG. 1 shows a non-limiting example of an entertainment environment 100. In particular, FIG. 1 shows a computing system 102 in the form of an entertainment console that may be used to play a variety of different games, play one or more different media types, and/or execute non-game applications and/or operating systems. The computing system 102 is connected to a display device 104 such as a television or a computer monitor, which may be configured to present media content, game visuals, non-game computing content, etc. to users in entertainment environment 100.

In some cases, the computing system 102 may act as a content source, such as by executing a video game stored on computer-readable media (e.g., an optical disc) or local storage device of the computing system. In other cases, the computing system 102 may be configured to provide intermediate control of content provided by another source. In the illustrated example, the computing system 102 is connected to a content source device 106 in the form of a cable box.

The content source device 106 may be configured to provide linear and non-linear content for presentation via the display device 104. Linear content may include any suitable form of live or time synchronous content, such as live television programming Non-linear content may include any suitable form of time asynchronous or time-shifted content, such as previously recorded television programming or video on-demand content. It will be understood that content source device 106 may provide any suitable content to computing system 102 and/or display device 104 without departing from the scope of the present disclosure.

In some implementations, computing system 102 may include video and/or audio signal pass-through functionality (e.g., HDMI pass-through). In particular, pass-through functionality may allow a video and/or audio signal sent from content source device 106 to be directed through computing system 102 to display device 104 with little or no modification to the signal by the computing system. Such pass-through functionality may reduce losses in signal quality while also allowing for computing system 102 to control transmission of the signal to display device 104. The pass-through may provide additional functionality, such as overlaying a graphical user interface (GUI) on top of the existing video signal and other functionality described in further detail herein.

In some implementations, computing system 102 additionally and/or alternatively may be configured to communicate with one or more remote computing systems, not shown in FIG. 1. For example, computing system 102 may receive video content directly from a broadcaster, third-party media delivery service, or other content provider. Computing system 102 may also communicate with one or more remote services via the Internet or another network, for example in order to analyze received audio and/or image data, perform speech recognition, etc.

Computing system 102 may include a shell configured to provide a GUI 114 that allows users to access (e.g., via voice commands) various operating system (OS) services and applications executed by computing system 102. GUI 114 may be visually organized in any suitable manner without departing from the scope of the present disclosure. For example, GUI 114 may present various destinations or pages in the shell. Such destinations or pages may include different applications and/or digital content. For example, digital content may include music, movies, TV programs, games, and other forms of digital media. In one example, GUI 114 may include a home page providing access to applications, digital content, and other shell destinations. In some cases, the home page may be curated based on preferences, behavior, and previous interactions of a user (or a group of users, e.g., a family).

Computing system 102 may be configured to support execution of a plurality of different applications. For example, GUI 114 may provide support for a diverse ecosystem of applications provided by computing system 102 and/or third-parties. For example, GUI 114 may include a shell destination in the form of an application store or portal for acquiring various applications and/or digital content. Further, acquired (e.g., downloaded) applications may be organized at various shell destinations and/or located or "pinned" on the home page.

Computing system 102 may be configured to support multi-tasking between different applications as well as background services. In one example, computing system 102 may be configured to support switching quickly between different applications that occupy the full screen of GUI 114. In another example, computing system 102 may be configured to display two or more applications simultaneously in a split-screen "snap" mode of GUI 114. In the illustrated implementation, GUI 114 is operating in the snap mode in which a TV feed 116 (e.g., provided via pass-through from content source device 106) and a social network application 118 are displayed simultaneously on display device 104. In yet another example, computing system 102 may be configured to run services or other tasks in the background while using different application in the foreground. In some implementations, such applications and background services may correspond to different contextual states of the computing system 102. In one example, user control of context-specific and multi-tasking functionality may be provided via voice commands as will be discussed in further detail herein.

The entertainment environment 100 further includes a capture device 108 that audibly and/or visually tracks objects within an observed scene. Capture device 108 may be operatively connected to the computing system 102 via one or more wired or wireless interfaces. In one non-limiting example, capture device 108 may include an infrared light source to project infrared light onto the physical space and a depth camera configured to receive infrared light. The capture device also may comprise other sensors, including but not limited to two-dimensional image sensor(s) (e.g., a visible light camera such as an RGB image sensor and/or a grayscale sensor) and one or more microphones (e.g., a directional microphone array).

Capture device 108 may be used to recognize, analyze, and/or track one or more human subjects within a physical space. In the illustrated implementation, capture device 108 may track a user 110 and a user 112. In one example, an infrared (IR) light source of capture device 108 may emit IR light that is reflected off objects in the physical space including users 110 and 112. The reflected IR light may be received by a depth camera of capture device 108. A depth map of the physical space may be constructed based on the received IR light. Capture device 108 may output depth maps to computing system 102, and the computing system may create a representation of the physical space based on the depth maps. The representation may be analyzed to recognize a position and/or orientation of objects in the physical space. Further, such information may be used to identify and differentiate each user interacting with the computing system (e.g., viewing the display, providing gesture-based input, providing voice input, providing control device input, and other suitable interactions), track movement of one or more users, perform gesture recognition of recognized users, etc. It will be understood that virtually any depth finding technology or other image analysis may be used to track users without departing from the scope of this disclosure.

Additionally or alternatively, capture device 108 may be configured to capture audio data that may be used to provide user input to computing system 102 in the form of voice commands. In one example, a directional microphone of capture device 108 may be used to capture speech from a user. Further, signals corresponding to the captured speech may be sent to computing system 102 to be analyzed by a speech recognition system to translate the voice input into a machine-understandable representation of the voice input. It will be understood that captured speech may be analyzed in any suitable manner to determine a voice command.

In some implementations, computing system 102 may be configured to include an always-available speech recognition system that can be triggered by a user without pressing a button or interacting directly with any physical device to activate voice commands. In some implementations, the speech recognition system may be incorporated into an OS of computing system 102 such that the speech recognition system may be used platform-wide to control different interactions with different applications and/or services executed by the computing system.

In some implementations, capture device 108 may be configured to track a user using both audio and video data cooperatively. In one example, the video data may be used to establish an identity of a speaker. In another example, speech data captured by a directional microphone may be used to determine from which direction a speech command is being issued. Further, one or more cameras of the capture device optionally may image a user in the determined direction to confirm that the user provided the speech command. More, particularly, in one example, movements of the user (e.g., movements of the mouth, tongue, and/or throat) may be used to determine if the user is speaking. If it is determined that the user is speaking, audio data received by computing system 102 may be analyzed to recognize one or more of the words spoken by the user. The mouth, tongue, and/or throat movements also may be used to augment the process of identifying the spoken words, for example by confirming that the identified words were spoken, adding additional identified spoken words, etc.

In a scenario where multiple users are located in the entertainment environment, relative positions and/or orientations of each user may be used to distinguish which users are speaking to provide speech input for controlling computing system 102. In one example, if a user is not facing capture device 108 when speaking, then it may be determined that the user is not providing speech input.

Furthermore, computing system 102 may be configured to identify each user in the entertainment environment based on audio and/or video data received from capture device 108. For example, facial recognition, voiceprint identification, anatomical measurements (e.g., derived from depth map information), and/or other suitable techniques may be used to determine a biometric identity of a user in the entertainment environment. In one particular example, voice input directionally identified with a beam forming microphone array may be correlated with any biometric identification discerned using standard and/or depth video to identify a user. It will be understood that user identification can be accomplished in any suitable manner.

Furthermore, once a user has been identified, that user may be tracked (via the capture device, for example) and such tracking may be associated with the user's identity. Such identity based tracking may help to facilitate the efficient matching of future recognized speech to identified speakers, and therefore to quickly identify which speech recognition model/parameters to use for a particular user (e.g., to tune the speech recognition for that user).

In some implementations, capture device 108 may include a broadcast device configured to broadcast control signals to audio/video devices in the entertainment environment. In one example, a broadcast device may include an IR transmitter or "blaster" configured to emit controlled bursts of infrared light into the entertainment environment. The IR blaster may be used to emulate signals typically sent from an associated IR remote control device to autonomously control a device that is otherwise controlled by that associated IR remote control device. Accordingly, the capture device may be configured to send control command signals to control various audio/video (A/V) components (e.g., display device 104 and content source device 106) in the entertainment environment via the IR blaster.

In another example, the broadcast device may include a local-area network broadcast device configured to broadcast wired or wireless signals to audio/video devices on a local-area network of the entertainment environment. For example, the computing system 102, the display device 104, and the content source device 106 may be connected to a local-area network, and the broadcast device may send signals via the local-area network to control such devices based on voice input from a user.

In another example, the broadcast device may include a consumer electronic control (CEC) broadcast device configured to broadcast CEC signals to audio/video devices via different high-definition multimedia interface (HDMI) links with the broadcast device. For example, the computing system 102, the display device 104, and the content source device 106 may be connected via HDMI links, and the broadcast device may send CEC signals via the HDMI links to control such devices based on voice input from a user.

In some implementations, the broadcast device may be a standalone device that is not incorporated into the capture device. In some implementations, the broadcast device may be incorporated into one or more audio/video devices and or computing systems in the entertainment environment.

The above described features of capture device 108 may be leveraged by computing system 102 to provide various functions to users in the entertainment environment. For example, information from capture device 108 may be used by computing system 102 to provide video and/or voice chat capabilities with remote users. In one example, capture device 108 may capture video and audio data of user 110 interacting with entertainment environment 100. Further, computing system 102 may send the captured video and audio data to another remotely located user's computer as part of a video chat session. In some implementations, such video chat functionality may be incorporated into an application that may be executed simultaneously with other applications by computing system 102.

In another example, the identification of users and tracking of identified users may allow for users to provide voice commands to control various operations of computing system 102. Further, each voice command may be automatically associated with a speaking user's identity that enables that command to have personalized results and personalized suggestions for controlling computing system 102.

Computing system 102 may be configured to recognize platform-wide voice commands as well as application and/or context-specific voice commands Platform-wide voice commands may be usable from anywhere in the shell/GUI, regardless of which application or activity the user is currently engaged in. Non-limiting example interactions that may be enabled by platform-wide voice commands may include: navigating to a shell destination, such as a home page, settings, social or media hub, etc.; launching an application or switching back to a recent or currently running application; launching or resuming an activity, such as watching TV, video, music, gameplay, or web browsing; snapping an application next to the current application(s), or hiding one of the currently snapped applications from view; switching input focus between currently running applications (e.g., to enable speech commands or other input events to target that application); controlling background music without leaving the current foreground experience; controlling background VOIP communications without leaving the current foreground experience; and controlling background game digital video recorder (DVR) recording without interrupting the gameplay being recorded. It will be understood that a platform-wide voice command may control any suitable operation of computing system 102 without departing from the scope of the present disclosure.

Furthermore, application-specific voice commands only may be recognized under certain conditions. In one example, application-specific voice commands associated with a particular application only may be recognized when that particular application is being executed. In some cases, such voice commands only may be recognized when that application is displayed in GUI 114. In other cases, such voice commands may be recognized when that application is running in the background (e.g., controlling a music application running in the background). In another example, in a scenario where multiple applications are being executed simultaneously (e.g., in the snap mode), application-specific voice commands only may be recognized when the application associated with the application-specific voice commands is given focus over the other active applications.

Like application-specific voice commands, context-specific voice commands only may be recognized under certain conditions or contextual states of the GUI or computing system 102. For example, the contextual states may include a music state, a video state, a gameplay state, and a communication state. In one example, the computing system may be in the music state when a background music service or music application is being executed and/or presenting music or other audio content. In one example, the computing system may be in the video state when a background video service or video application is being executed and/or presenting video or other visual content. In one example, the computing system may be in the gameplay state when a video game is being executed. In one example, the computing system may be in the communication state when a background communication service or communication application is being executed and/or communication (e.g., VOIP, video conference, or other form of communication) is initiated with a remote user.

In another example, context-specific voice commands may be further related to a particular user, and such voice commands only may be recognized when those voice commands are spoken by that user. For example, voice commands for modifying Jeffery's user profile may only be recognized when spoken by Jeffery. It will be understood that this is merely one example, and application-specific voice commands and context-specific voice commands may be recognized based on any suitable conditions. Note that in some implementations application-specific voice commands may be considered as a type of context-specific voice command.

In some implementations, some voice commands may be parameterized—meaning a function of the voice command may change based on a parameter used in the voice command. Stated another way, a parameterized voice command may include a root operation and one or more parameters that modify the root operation. Non-limiting examples of voice command parameters include application names, friend names, content names, etc. In one example, a "call" root voice command may be modified by a "friend" parameter. As such, if a user says "call Walter," then computing system 102 may look up a contact number for Walter in the user's friend list and initiate a voice-over internet protocol (VOIP) call or chat session to Walter's number. On the other hand, if a user says "call Theodore," then computing system 102 may look up a contact number for Theodore in the user's friend list and initiate a VOIP call to Theodore's number. In other words, the response to the "call" voice command may change based on the parameter selected by the user.

In another example, parameterized voice commands that reference the name of an application or game as a parameter may be particularly useful in the above described computing system, because of the extensive use of applications in the computing system. In particular, parameterized voice commands may provide an easy way to launch, navigate to, or otherwise use an application installed on computing system 102.

Furthermore, parameterized voice commands may allow the user to quickly download and install new applications without needing to search through an online storefront. Rather, in one example, a user may merely say "buy"+an application/game title as a parameter to initiate purchase of that application/game. In this particular example, to ensure high accuracy for the speech recognition, the application/game parameter may be limited to a set of available applications/games. In one example, the set of available applications/games may be limited to applications pinned or marked as favorites by the user or members of a group to which the user belongs (e.g., the user's family). In another example, the set of available applications/games may be limited to applications that have been downloaded by friends in the user's online social graph. In another example, the set of available applications/games may be limited to applications that are popular with the community at large. In another example, the set of available applications/games may be limited to applications that have been manually curated by an online service, such as to promote a recently released or advertised title, and other suitable applications. In another example, the set of available applications/games may be limited to some combination of the examples described above.

Similarly, voice commands may be used to quickly download applications/games owned by the user but not currently installed on the computing system (e.g., applications purchased on another computing system).

It will be understood that any suitable parameter may be used to modify a voice command without departing from the scope of the present disclosure. In some cases, a voice command may include a plurality of parameters that each may change the response to the voice command.

Due to the complex nature of the shell and general operation of computing system 102 there may exist a multitude of voice commands that may be used in numerous different situations while interacting with the computing system. The use of voice commands may produce a number of factors that may inhibit the user from learning the voice commands. A total number of voice commands supported in the system may be too large for most users to reasonably memorize. Computing system 102 may be configured such that a user must speak voice commands using specific syntax and terminology to successfully use voice commands. In other words, in some implementations, computing system 102 may not support unrestricted natural language input. Although in other implementations, computing system 102 may support unrestricted natural language input. Many commands may be only contextually available or relevant (e.g., "pause" only applies when media is playing). Many commands may be parameterized (e.g., a "go to <application name>" command can be used to launch many different applications).

Accordingly, computing system 102 may be configured to provide suggestions and tips that may help users learn how to use voice commands appropriately in order to efficiently and successfully control operation of the computing system.

Figure 2:
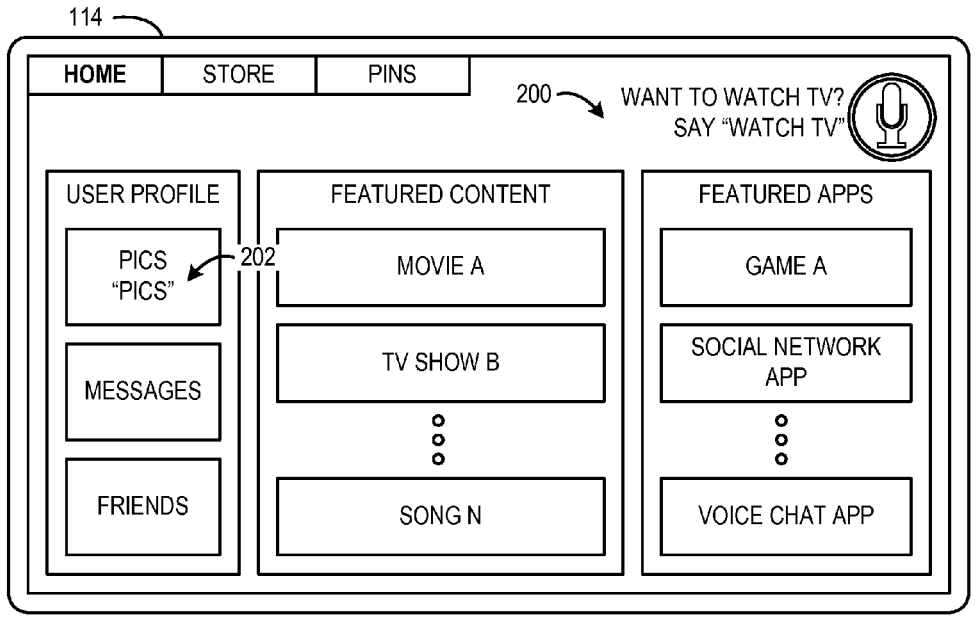
FIG. 2 shows an example graphical user interface (GUI) including an example voice-command suggestion.

In some cases, voice-command suggestions may be displayed proactively (and unobtrusively) in the GUI. For example, as shown in FIG. 2, GUI 114 is directed to a home page of the shell. The home page includes various links or launch points to digital content, applications, and other information associated with a user (or group of users). As user(s) interact with the home page, computing system 102 may display a voice-command suggestion 200 in GUI 114 without being prompted by the user. Voice-command suggestion 200 may include a microphone icon that may be easily recognized by a user as being a voice-command suggestion. This is merely one example of a voice-command suggestion icon, and it will be understood that any suitable visual cue may be employed. Such unprompted voice-command suggestions may be displayed based on any suitable factors and may be displayed at any suitable time.

In some implementations, each link of the home page may include a voice-command suggestion or cue for launching or navigating to the corresponding content, application, etc. For example, a voice-command suggestion 202 including the term "pics" may be displayed by a link to a shell destination where a user's pictures are displayed. The voice-command "pics" may be spoken by a user to navigate to the shell destination where the pictures are displayed.

In the illustrated implementation, suggested voice commands are indicated by quotations. However, it will be understood that voice-command suggestions may be visually indicated in any suitable manner. In one example, all voice-command suggestions may be displayed in the same color in order to make them easy to identify by users as being voice-command suggestions. The color used for voice-command suggestions may be reserved for voice command suggestions, such that no other text is displayed in that color. In another example, voice-command suggestions may be organized into different categories that may be color coded. In another example, voice-command suggestions may apply to specific users. Accordingly, different voice-command suggestions that apply to different users may be presented with different visual indications. For example, voice-command suggestions that apply to a first user may be presented in a first color, and voice-command suggestions that apply to a second user may be presented in a second color that differs from the first color. Any suitable visual indication may be used to associate voice-command suggestions with different users.

Figure 3:
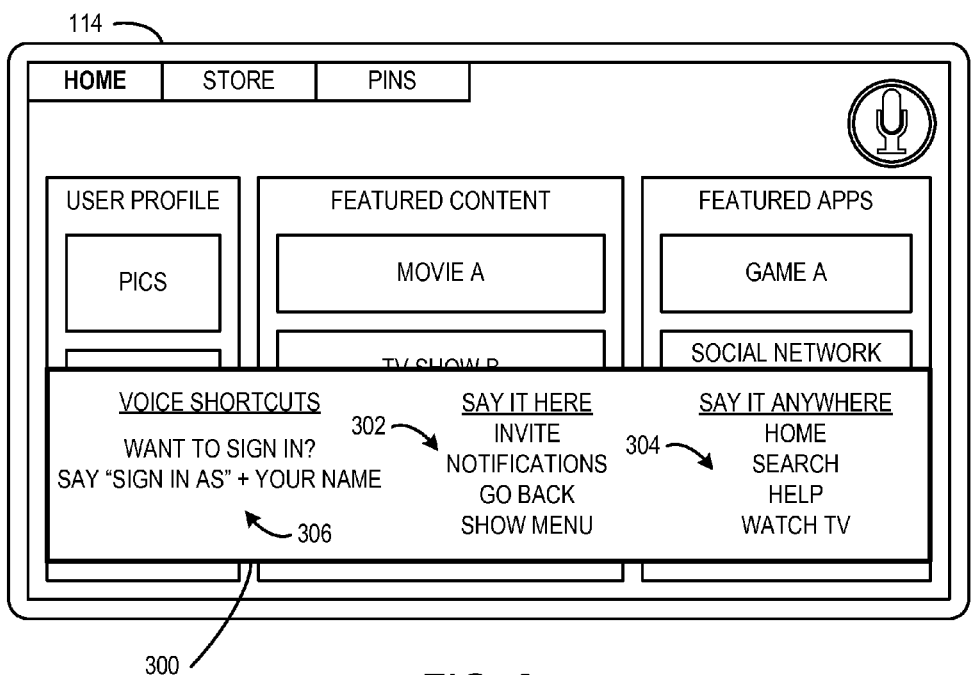
FIG. 3 shows an example GUI including an example overlay of voice-command suggestions.

In some cases, voice-command suggestions may be displayed in an overlay that can be quickly summoned by a user. For example, as shown in FIG. 3, GUI 114 includes a voice-command suggestion overlay 300 that is displayed in front of the home page. In one example, a user may summon overlay 300 by saying "help," "computer select," or another specific command. Overlay 300 may be presented responsive to any suitable request for voice-command suggestions received via user input. In some cases, overlay 300 may include voice-command suggestions 302 that are application and/or context specific. In the illustrated example, voice-command suggestions 302 may be context-specific and may be particularly applicable to the home page. Further, overlay 300 may include voice-command suggestions 304 that are applicable platform-wide and may be usable in any portion of the shell.

In some implementations, the computing system 102 may be configured to present a parameterized voice-command suggestion 306. Parameterized voice-command suggestion 306 may correspond to a parameterized voice command including a root operation and a parameter that modifies the root operation In the illustrated example, parameterized voice-command suggestion 306 includes a voice-command having a "your name" parameter. The computing system may respond differently based on the parameter (e.g., name) that is used with the voice-command. In one example, if a user says "sign in as Jeffery" then the computing system may configure the home page (and other destinations in the shell) based on Jeffery's preferences. On the other hand, if a user says "sign in as Walter" then the computing system may configure the home screen and other destinations in the shell based on Walter's preferences.

In some implementations, parameterized voice-command suggestion 306 may be application and/or context specific. In this example, the "sign in" voice-command suggestion may be selected for display in overlay 300 based on GUI 114 being directed to the homepage. The root and/or the parameter of a parameterized voice-command suggestion may be selected for presentation in any suitable manner. In some implementations, a parameterized voice-command suggestion may be displayed with a personalized parameter value selected based on a user identity. In some implementations, a parameterized voice-command suggestion may be displayed with a context-specific parameter value selected based on an identified contextual state.

Furthermore, in some implementations, the computing system 102 may be configured to dynamically change a parameter value over time to include different parameter values to aid users in finding a suitable voice command. The parameter values displayed with the voice-command suggestion may be changed in any suitable manner. Moreover, the examples may be dynamically changed responsive to exceeding any suitable duration or based on another trigger. In one example, a first personalized parameter value selected based on a user identity may be changed to a different personalized parameter value selected based on the same user identity. In another example, a first context-specific parameter value selected based on a first contextual state may be changed to a different context-specific parameter value selected based on a second contextual state that differs from the first contextual state. In another example, a context-specific parameter value selected based on a first contextual state may be changed to a different context-specific parameter value selected based on the same contextual state.

In some cases, if multiple users are interacting with the computing system, then voice-command suggestions may be dynamically changed with information related to the different users.

Figure 4:
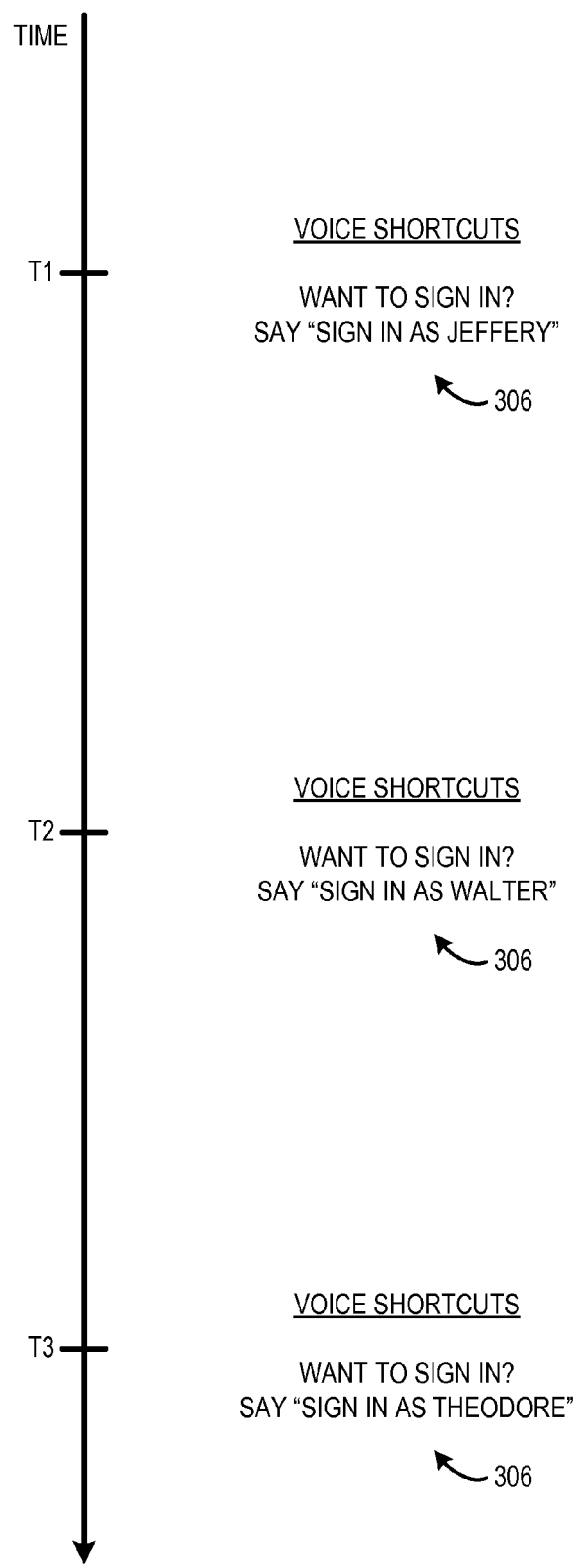
FIG. 4 shows an example scenario in which different parameters of a voice-command suggestion are displayed over a time period in a GUI.

In one example scenario shown in FIG. 4, the computing system identifies that Jeffery, Theodore, and Walter are interacting with the computing system. Accordingly, parameterized voice-command suggestion 306 is displayed to suggest that the users sign in to the computing system in order to personalize appearances and other settings of the computing system. In particular, at time T1, parameterized voice-command suggestion 306 includes "Jeffery" as the parameter. Further, at time T2, parameterized voice-command suggestion 306 is updated to include "Walter" as the parameter. Further still, at time T3 parameterized voice-command suggestion 306 is updated again to include "Theodore" as the parameter. In one example, the parameter may be changed after a period of time without receiving a response.

Similarly, in a single user scenario, a parameter in a parameterized voice-command suggestion may cycle through different parameter information related to a single user. In one example, names of different friends listed in a contact list of a user may be used to update a friend parameter in a parameterized voice-command suggestion. More particularly, a name of a different friend in the contact list may be displayed at regular intervals to cycle through the contact list while the overlay is being displayed.

Figure 5:
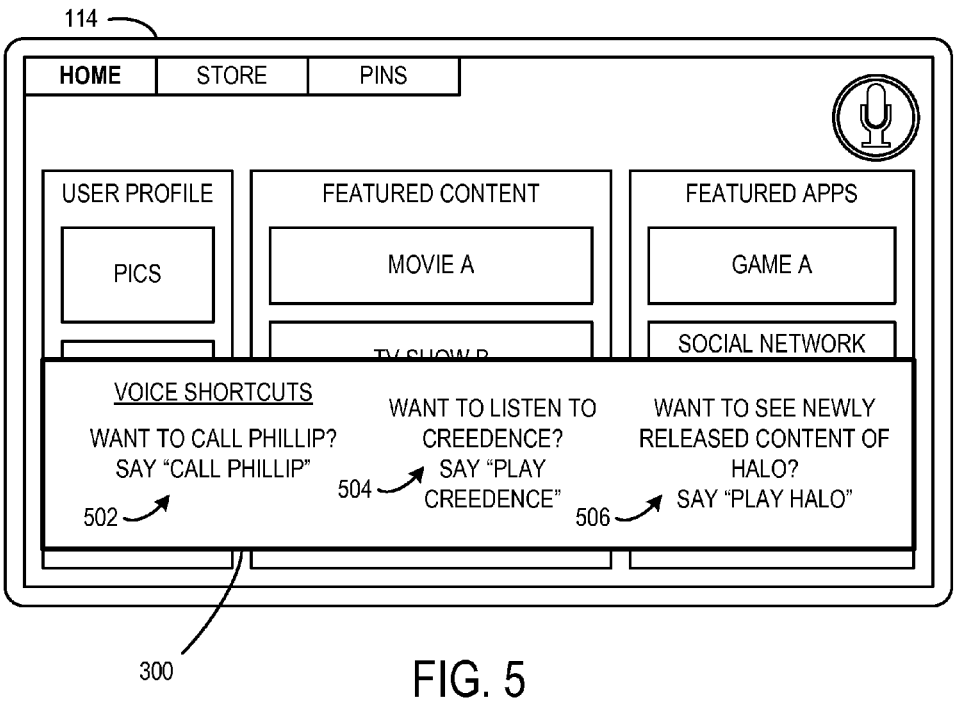
FIG. 5 shows an example GUI including parameterized voice-command suggestions including personalized values of parameters.
Figure 6:
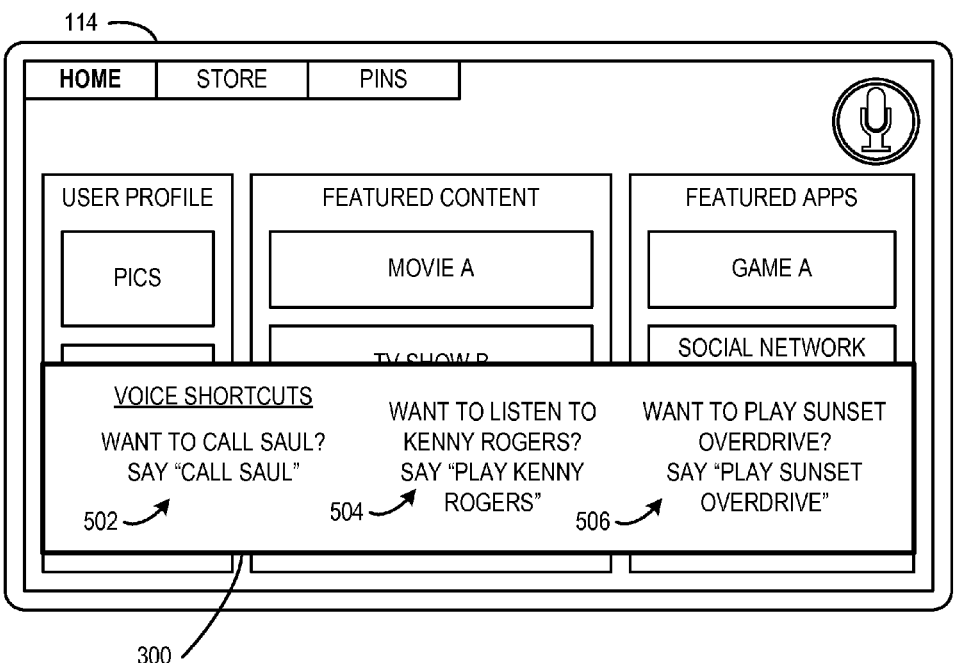
FIG. 6 shows the example GUI of FIG. 5 including parameterized voice-command suggestions including dynamically changed personalized values of parameters.

In some implementations, parameters of voice-command suggestions may be personalized based on an identified user (e.g., via biometric identification). In one example, computing system 102 may determine that an identified user has a friend named Phillip listed as a contact in a list of contacts, and as shown in FIG. 5, a friend parameter of a voice-command suggestion 502 may be personalized to say "Want to call Phillip? Say 'call Phillip'." Further, responsive to exceeding predetermined duration (e.g., five seconds) without receiving suitable voice input, the parameterized voice-command suggestion may be dynamically changed, as shown in FIG. 6, to present a different personalized example. For example, the voice-command suggestion 502 may be dynamically changed to list a different friend named Saul listed as a contact in the list of contacts. In particular, the voice-command suggestion 502 may be personalized to say "Want to call Saul? Say 'call Saul'."

In another example, computing system 102 may determine that the identified user has recently purchased a Creedence album (e.g., via a store page of the shell), and an artist parameter of a voice-command suggestion 504 may be personalized to say "Want to listen to Creedence? Say 'play Creedence'." Further, responsive to exceeding a predetermined duration (e.g., five seconds) without receiving suitable voice input, the parameterized voice-command suggestion may be dynamically changed, as shown in FIG. 6, to present a different personalized example. For example, the voice-command suggestion 502 may be dynamically changed to list a different artist to which the user most frequently listens. In particular, the voice-command suggestion 502 may be personalized to say "Want to listen to Kenny Rogers? Say 'play Kenny Rogers'."

In another example, developers of computing system 102 may be partnered with a video game studio that releases new content for a video game, such as Halo. A game parameter of a voice-command suggestion 506 may be personalized or dynamically changed to align with a promotion for the new content. In particular, voice-command suggestion 506 may say "Want to see newly released content of Halo? Say 'play Halo'." Further, responsive to exceeding predetermined duration (e.g., five seconds) without receiving suitable voice input, the parameterized voice-command suggestion may be dynamically changed, as shown in FIG. 6, to present a different personalized example. For example, the voice-command suggestion 502 may be dynamically changed to list a different video game that the user most frequently plays. In particular, the voice-command suggestion 502 may be personalized to say "Want to play Sunset Overdrive? Say 'play Sunset Overdrive'."

In another example, parameters of voice-command suggestions may be personalized based on information related to consumption habits of the user's friends. It will be understood that a voice-command suggestion parameter may be personalized based on any suitable user related information.

The computing system 102 may be configured to make intelligent decisions about which voice-command suggestions are selected for presentation based on various factors. In one example, the computing system 102 may be configured to select one or more voice commands from a set of voice commands based on one or more factors. In one example, the set of voice commands may include a voice-command library that includes all voice commands understood by the computing system 102, and/or applicable to control operation of the computing system 102, and/or applicable to control operation of another audio/video device in the entertainment environment. Any suitable number of voice commands may be selected for presentation based on any suitable factor or combination of factors.

The set of voice commands from which the corresponding voice command suggestions are selected includes only the voice commands that the computing system is currently configured to understand and process. In this manner, the system will not suggest voice commands that the system is not currently able to understand or process. As such, before suggesting any voice commands, the system may access a database that includes the set of currently understandable and processable voice commands. Furthermore, the computing system may dynamically update this database.

In some implementations, voice-command suggestions may be selected for presentation based on a current state of GUI 114 and/or of the computing system 102. For example, particular voice-command suggestions may be displayed based on a shell destination currently being displayed in the GUI, controls currently being displayed on the screen, media currently being played, online communications with other users being in progress, a user currently multitasking between multiple applications, and other suitable states of the GUI.

In one example, to simplify the process of selecting voice commands to suggest for the current state of the GUI, voice-command suggestions may be divided into a set of basic computing contexts. For example, these contexts may include: music is playing, video is playing, a video game is being played, a VOIP communication is in progress, two or more applications are snapped side-by-side for multitasking, and a default context for GUI navigation scenarios. For example, the music context may include voice-command suggestions to play and pause music, mute the volume and skip between tracks in a playlist. For example, the video context may include voice-command suggestions to play and pause video, mute the volume, and rewind and fast forward video. For example, the gameplay context may include voice-command suggestions to pause gameplay, invite friends to play a game, save a game, and quit a game. For example, the VOIP communication context may include voice-command suggestions to call a friend, increase and decrease call volume, and end a call. For example, the snap mode may include voice-command suggestions to switch focus between different applications and enlarge an application to full screen. For example, the default GUI navigation context may include voice-command suggestions to navigate to a particular shell destination, go to the home page, open a web browser, and send an email.

In some cases, the GUI 114 and/or the computing system 102 may operate in a plurality of contextual states at the same time. For example, the GUI 114 may operate in a plurality of contextual states when a plurality of applications are displayed at the same time (e.g., a multitasking snap mode), an application is displayed while a background service is performing an operation (e.g. a video game is being played while a chat session is being performed), a plurality of background services are performing operations in parallel (e.g., a media content item is being downloaded while music is being played), or another multitasking scenario occurs.

In some embodiments, the above described contexts may be ranked in priority order, since more than one context may apply at the same time (e.g., multitasking while video is playing). In one example, the computing system 102 may be configured to identify a plurality of contextual states, assign a priority order to the plurality of contextual states, and select one or more voice commands according to the priority order. In one example, different contextual states may have different predetermined priority rankings, and the priority rankings of each identified contextual state may be compared to produce the priority order. In another example, priority rankings of contextual states may be determined based on a user identity, such as based on preferences of a user. In some implementations, the priority order may be dynamically changed based on the preferences of the user. For example, if a user previously listened to music more often than the user played video games, then music related voice-command suggestions previously may have been prioritized over video game related voice commands. However, if the preferences of the user change such that the user now plays video games more often than the user listens to music, then the priority order may be dynamically changed to prioritize video game related voice-command suggestions over music related voice-command suggestions.

In another example, an application or service that currently has focus (e.g., is currently being displayed and/or is being interacted with by a user) over the other of the plurality of contextual states may be assigned a highest priority of the priority order. In one example, a voice command may be selected based on the voice command being associated with a contextual state having the highest priority.

In another example where a plurality of voice commands are selected for presentation as context-specific voice-command suggestions, voice command selections may be made starting with a contextual state having the highest priority and moving down the priority order to make additional selections. In such an example, voice-command suggestions associated with contextual states having higher priority in the priority order may be more likely to be displayed over voice-command suggestions associated with lower priority contextual states.

In another example where a plurality of voice commands are selected for presentation as context-specific voice-command suggestions, a selected number of displayed context-specific voice-command suggestions corresponding to a contextual state having a higher priority may be greater than a selected number of displayed context-specific voice-command suggestions corresponding to a contextual state having a lower priority.

In some implementations, voice-command suggestions may be selected for presentation based on an identity of one or more users interacting with the computing system. In one example, the computing system 102 may be configured to identify a user identity of a user interacting with the computing system. For example, the capture device 108 may capture audio and/or video data that may be used by the computing system to biometrically identify a user. In one example, the computing system 102 may biometrically identify a user by performing facial recognition on video data received from the capture device 108. In some implementations, identifying a user may include associating the user with a user identify or profile. The user identity may include any suitable information that characterizes the user. For example, a user identity may include user preferences, customizations, user interaction history, achievements and rewards, relationships and associations in social networks, and other suitable information.

In one example, voice-command suggestions may be displayed based on a user's history of previous voice commands. For example, voice commands that have been repeatedly used successfully by the user may be omitted from any displayed suggestions and instead replaced by other voice-command suggestions that have not previously been successfully employed by the user. In other words, as a user learns various voice commands, new or different voice commands may be suggested to the user. Further, voice commands may be suggested that expand on voice scenarios the user has used in the past. For example, if a user has successfully used the voice command "play music" in the past, then the overlay may display suggestions including "rewind music," "pause music," "play next track," and other voice commands related to control of playing music.

In another example, voice-command suggestions may be displayed based on a user's other product usage. For example, voice commands related to tasks that a user has expressed interest in may be suggested over other voice commands. In one example, if a user favors watching TV more than listening to music, then voice commands relating to controlling TV may be suggested over voice commands relating to controlling music. In some embodiments, such voice commands may be suggested even if the user had not employed voice commands previously for such tasks. In another example, voice-command suggestions corresponding to voice commands for controlling an application that has been used by the user may be selected for presentation. In one example, if a user favors using a streaming video content application, then voice-command suggestions corresponding to voice command for controlling the streaming video content application may be selected for presentation.

In another example, voice-command suggestions may be displayed based on a user's history of seeing suggestions. For example, if a user has repeatedly ignored a particular suggestion previously included in overlay 300, that suggestion may be omitted from being included next time overlay 300 is displayed or may be postponed from being displayed in overlay 300 for a period of time.

In another example, voice-command suggestions may be manually curated. For example, computing system operators, content developers, and/or third parties may provide new voice commands once the computing system has been released for use, and such new voice commands may be suggested over other older voice commands. In one example, new voice commands may align with a current marketing campaign and may be dynamically suggested.

In some implementations, the set of voice commands from which a voice command may be selected based on user identity may be limited to a context-specific subset of the set of voice commands. In other words, a voice command may be selected based on user identity and contextual state. In one example, the context-specific subset may be limited to voice commands for controlling operation of the computing system according to an identified contextual state. For example, if the computing system is operating in a music playing contextual state, then the subset of voice commands may be limited to voice commands for controlling how music is played (e.g., voice commands for changing selecting music to be played, changing volume, skipping tracks, pausing music, and other music related functionality). In such implementations, a voice command may be selected from the set of voice commands based on any suitable aspect of the user identity.

In some implementations where a plurality of voice-command suggestions are selected for presentation, the computing device may be configured to select some of the plurality of voice-command suggestions based on contextual state and separately select some of the plurality of voice-command suggestions based on user identity independent of contextual state.

Furthermore, in some implementations, voice-command suggestions may be dynamically selected for presentation based on a user that is recognized as a controlling user ready to provide voice input to the computing system. In one example, whenever a user provides voice input that user may be recognized as the controlling user. In another example, a user may be recognized as a controlling user responsive to providing other modes of user input (e.g., gesture input, controller-device input, or another form of user input). Control may be given to a user responsive to performing any suitable action or providing any suitable user input.

In such implementations, a voice-command suggestion may be selected based on a user identity of a controlling user, when control is switched to a different user, a different voice-command suggestion may be selected based the different user's identity. In such implementations, the computing system may dynamically change the voice-command suggestion being presented in order to reflect the difference in identities and corresponding preferences, habits, experiences, skills and other characteristics of the different controlling users. In other words, the computing system personalizes the voice-command suggestions according to whichever user is determined to be most likely to provide voice input.

In some implementations, computing system 102 may periodically display inline suggestions while a user is performing a task. These suggestions may encourage the user to try a voice command, or suggest the next step in a multiple-turn voice conversation with computing system 102. In some cases, the suggested actions may replace a longer alternative process previously carried out by the user. In particular, these inline suggestions may be used to correct inefficiencies detected in how the user is accomplishing a task.

In one example, the computing system 102 may be configured to receive a plurality of voice commands that end with performance of an operation, and present via the display 104 a voice-command shortcut suggestion subsequently useable to perform the operation with fewer voice commands than the plurality of voice commands that were previously used to effectuate the same eventual result.

Figure 7:
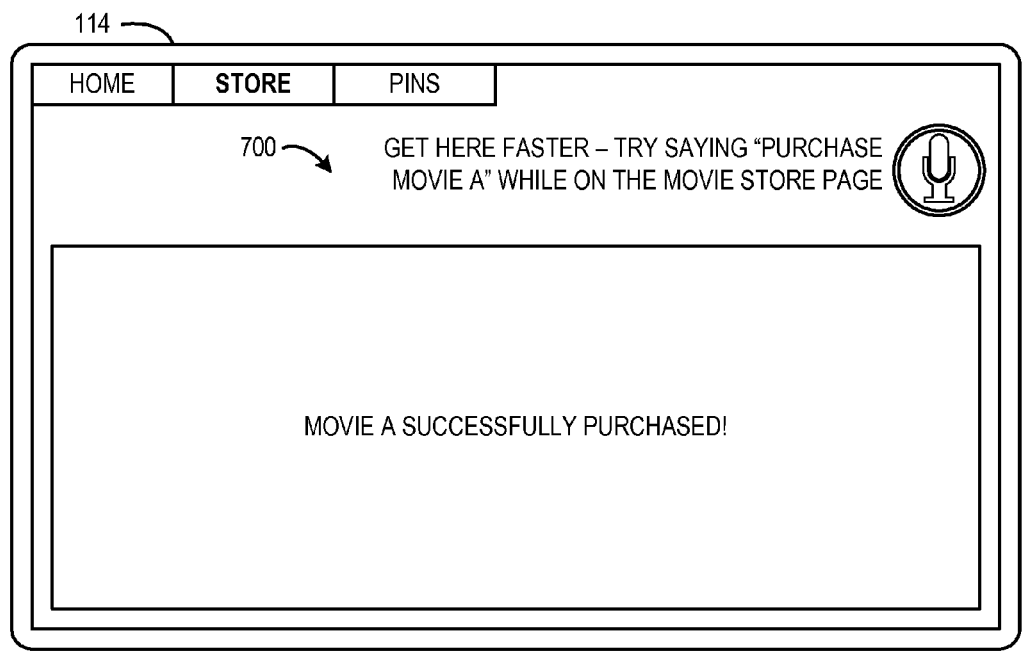
FIG. 7 shows an example GUI including a voice-command suggestion for a shortcut to performing an operation.

In one example shown in FIG. 7, a user may perform a multi-step process to purchase a movie from a movie store page displayed in GUI 114. For example, the process may include navigating to a genre section of the movie store that lists a plurality of movies, then navigating to the particular movie, then navigating to the details screen for purchasing the movie, and finally selecting a purchase button to purchase the movie. Upon completion of this purchase process, computing system 102 may track the steps of the user and determine that there is a more efficient approach to purchasing the movie. In an attempt to correct the inefficiency, computing system 102 may be configured to display a voice-command suggestion 700 that provides a shortcut to successfully perform the task of purchasing the movie in fewer steps. In particular, the voice-command suggestion states "get here faster-try saying 'purchase movie A' while on the movie store page."

In another example, a plurality of voice commands may correspond to a plurality of user interface navigation operations that navigate from a starting user-interface location, through one or more intermediate user-interface locations, to an ending user-interface location. The computing system 102 may be configured to determine that there is a voice command that results in navigating from the starting user-interface location directly to the ending user-interface location, and select a voice-command shortcut suggestion that corresponds to the voice command for presentation.

In another example, a plurality of voice commands may correspond to a plurality of user interface navigation operations that navigate to a virtual storefront and result in purchasing and installing a media content item on the computing system 102. The computing system 102 may be configured to determine that there is a voice command that results in purchasing a media content item directly without navigating to the virtual storefront, and select the voice-command shortcut suggestion corresponding to the voice command for presentation.

Furthermore, in this example, the voice command is a parameterized voice command that includes a name of a media content item to be purchased. In some implementations, the computing system 102 may be configured to select a personalized value of the parameter to present in place of the parameter in the voice-command shortcut suggestion. For example, when a user provides voice input that navigates to the virtual storefront and purchases Halo, upon completion of the purchase, the computing system may present a voice-command shortcut suggestion that is personalized based on the user's purchase habits (or another characteristic of the user's identity). In particular, the personalized voice-command shortcut suggestion may say "To get there faster—Next time say 'Buy Halo 2' to purchase Halo 2 without navigating to the virtual storefront."

In some implementations, voice commands may be used to control a wide range of media functions that involve third-party A/V equipment in the entertainment environment other than the computing system. Referring back to FIG. 1, for example, voice commands may be used to control operation of display device 104, content source device 106, and capture device 108. It will be understood that voice commands may be used to control any suitable A/V component or device in communication with computing system 102 or recognized by the computing system.

In one example, voice commands may be used to control third-party A/V devices configured to be controlled via IR signals, such as would be received from an associated IR remote control device. In particular, computing system 102 may control the IR blaster of capture device 108 to send signals responsive to a voice command. The IR signals may be configured to be recognized by arbitrary third party A/V devices to provide control of such devices. In some cases, such A/V devices may be unable to natively respond to voice commands. As such, the computing system 102 may provide such capabilities via the IR blaster of the capture device 108. For example, an initial setup process may be performed in which users specify which A/V devices, content providers, and programming services may be controlled by computing system 102 via voice commands Non-limiting examples of voice commands that control A/V devices include commands to: turn devices on and off individually or as a group, change inputs, control volume, change channels, direct navigation to channels based on content, channel number, name or affiliate information, and control DVR functions such as recording.

In some cases, in order to facilitate such functionality, computing system 102 may be configured to communicate with an online service, content provider, or another remote computing system to obtain information related to functionality of the A/V devices and/or content provided by the A/V devices. In one example, computing system 102 may be configured to communicate with an online service to receive IR signal codes that correspond to a particular A/V device. In another example, computing system 102 may be configured to communicate with an online service to receive electronic programming guide (EPG) data or video on-demand data for a user's available TV programming. In one example, a signal code may be derived from a programming guide corresponding to an audio/video device. In some cases, computing system 102 may collect such data during the initial setup process recognizing A/V components of the A/V stack. In one example, the program guide is received from a remoter online service computing device prior to selection of an operation corresponding to a machine-understandable representation of voice input. In some cases, computing system 102 may collect such data dynamically, such as responsive to a voice command.

Figure 8:
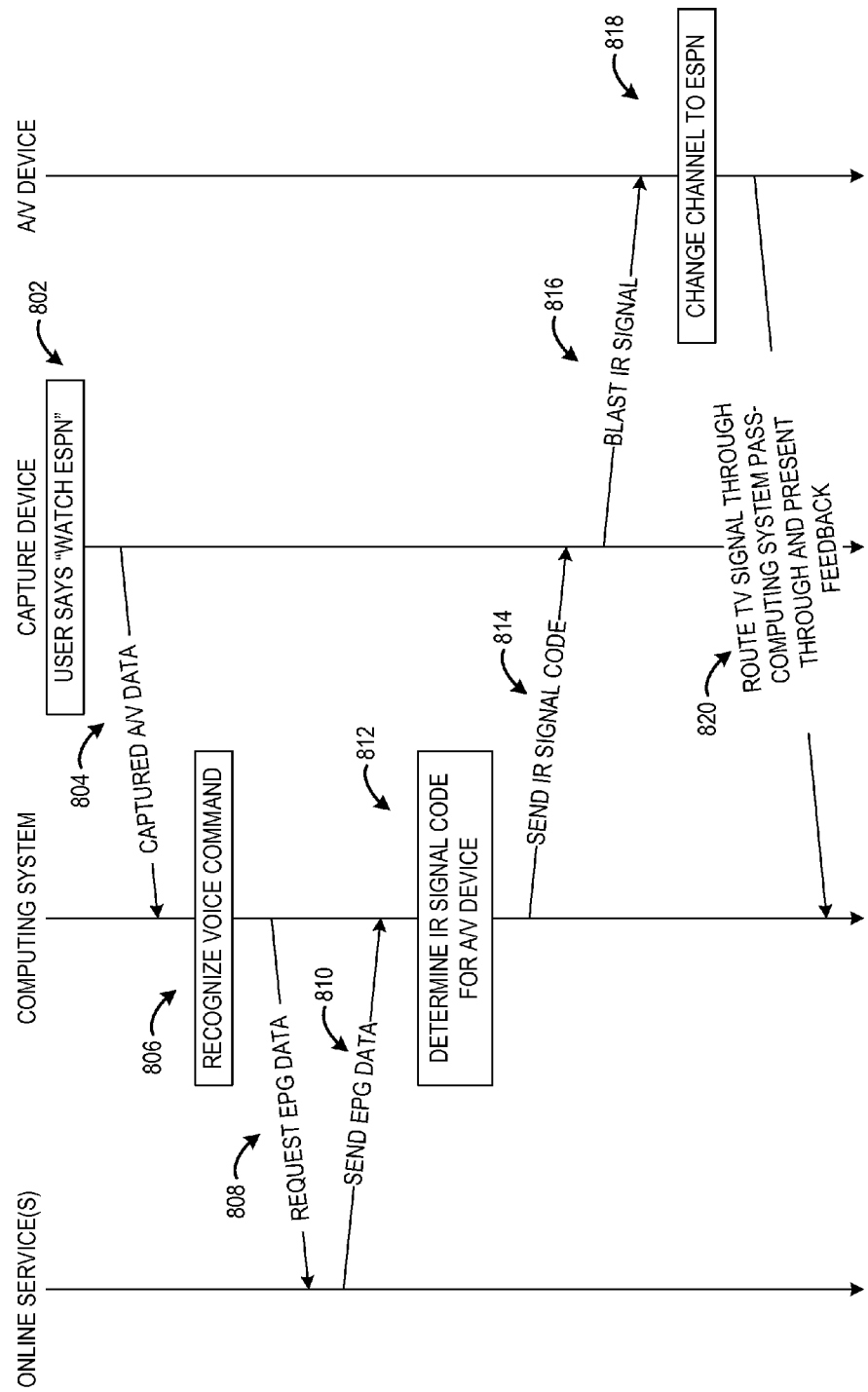
FIG. 8 shows an example communication flow diagram.

An example scenario in which a computing system controls an A/V device is shown in FIG. 8. At 802, the scenario starts with a user saying "Computer watch ESPN." In this example, the word "Computer" may replace a conventional push-to-talk trigger that would otherwise initiate voice input. At 804, the capture device captures the speech of the user as audio and video (A/V) data, via a microphone and sends the captured A/V data to the computing system. The computing system 102 may be configured to receive the voice input from the capture device 108. At 806, the computing system recognizes the words spoken by the user as a voice command (e.g., by processing the A/V data with a voice recognition system). In one example, the computing system may be configured to translate the voice input into a machine-understandable representation of the voice input. Further, the computing system may be configured to select an operation performable by an audio/video device and corresponding to the machine-understandable representation of the voice input.

In some implementations, the computing system may identify the user that spoke the voice command or was otherwise responsible for the voice input (e.g., via voice print identification or a combination of facial recognition and speaker correlation). Further, the computing system may access the identified user's profile of preferences and past usage data to determine which of several "ESPN" channels was most likely desired by that user.

At 808, the computing system may send a request to an online service for EPG data to determine which channel number of the user's content provider corresponds to ESPN. In other words, the computing system may be configured to identify a provider-specific version of the operation. More particularly, in this example, the provider specific version is identified by requesting a provider-specific identifier of the content channel from the content provider of the content channel.

At 810, the online service responds to the request by sending the EPG data to the computing system. In some implementations, the EPG data may be previously requested, cached at the computing system, and locally accessed responsive to receiving the voice input.

At 812, the computing system determines that the voice command requires a channel on the user's A/V device (e.g., cable box) to be changed, and determines an appropriate IR signal code corresponding to that channel. In some cases, the IR signal code may be determined based on information received during the initial setup process. In other cases, the computing system dynamically may request IR signal code information from an online service. In either case, the computing system may be configured to select an operation performable by an audio/video device and corresponding to the machine-understandable representation of the voice input.

At 814, the computing system sends the IR signal code to the capture device. At 816, the capture device blasts the IR signal corresponding to the IR signal code to the entertainment environment. In other words, the computing system may be configured to broadcast, via a broadcast device, a signal code for the operation in a format recognizable by the audio/video device.

At 818, the A/V device receives the IR code and changes the channel to ESPN. Further, at 820, the TV signal is routed through the computing system's HDMI input port and passed through the computing system to a display device for presentation to the user. In some implementations, the computing system may provide a GUI overlaid on the TV signal. For example, the GUI may provide voice-control suggestions to control presentation of the TV channel or operation of other aspects of the computing system and/or other A/V devices.

Furthermore, it will be understood that voice commands can be used for any suitable media-related actions. Non-limiting examples of such actions may include turning specific devices on and off; turning the entire A/V stack on and off as a unit; changing audio or video inputs; controlling volume (increasing or decreasing volume by varying amounts, or muting/unmuting the volume); changing TV channels based on channel number, channel name, or affiliate name; changing TV channels based on the current programming (e.g., based on the name of the show); and controlling DVR functions such as recording or playback of previously recorded content.

In some cases, the operation selected as corresponding to the machine-understandable representation of the voice input may be a macro operation including a plurality of sub-operations or steps. In such cases, the signal code that is broadcast by the broadcast device may be one of a plurality of signal codes. In some cases, a macro operation may include the same operation being performed by a plurality of different A/V devices. In this case, each of the plurality of signal codes may be broadcast in a format recognizable by a different audio/video device. In one example, the macro operation may include "turning on" a plurality of A/V devices in an A/V stack, and the sub-operations may include sending a signal code in each format recognizable by the plurality of A/V devices. In some cases, the macro operation may include a plurality of different signal codes sent to the same A/V device. In this case, each of the plurality of signal codes may be consecutively broadcast in the format recognizable by the A/V device. In one example, a macro operation may include changing a channel to "736" on a cable box, and signal codes corresponding to "7," "3," and "6" may be consecutively broadcast in a format recognized by the cable box.

Additional non-limiting examples of voice commands that may be used to control the computing system or other A/V devices may include: "Computer go home" to return to the speaking user's home page; "Computer go to <application name>" to launch or switch back to a game or application under the speaking user's context; "Computer go to <pinned content>" to launch or switch back to content pinned by the user (e.g. website, music album, TV show); "Computer snap <application name>" to launch an application in a smaller snapped state, next to the currently running application; "Computer unsnap" to hide the most recently snapped application; "Computer switch" to switch the input focus among snapped applications; "Computer watch TV" to launch a TV application and immediately resume watching the most recently watched TV channel; "Computer play music" to launch a music application and immediately resume the most recently played playlist (or unpause playback); "Computer pause music," "Computer next song" and "Computer previous song" to manipulate music playing in the background; "Computer call <friend's name>" to start a VOIP call with one of the speaking user's friends; "Computer hang up" to end the current VOIP background call; and "Computer record that" to record the recent gameplay footage and associate it with the speaking user's online profile.

Figure 9:
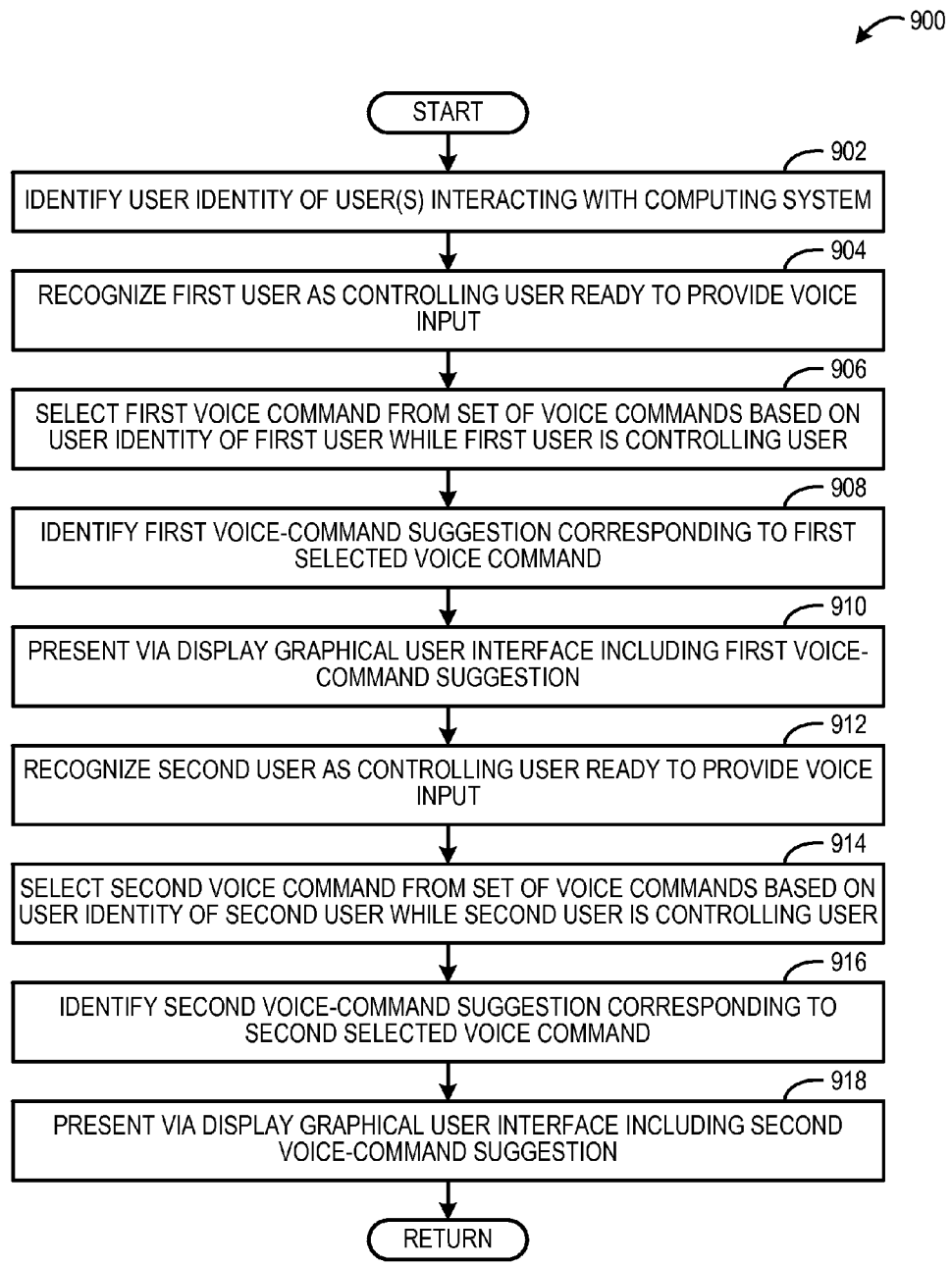
FIG. 9 shows an example method for presenting personalized voice-command suggestions.

FIG. 9 shows an example method 900 for presenting personalized voice-command suggestions. For example, the method 900 may be performed by the computing system 102 shown in FIG. 1 or the computing system 1400 shown in FIG. 14.

At 902, the method 900 may include identifying a user identity of one or more users interacting with a computing system.

At 904, the method 900 may include recognizing a user as a controlling user ready to provide voice input. In some cases, the user may be a first user of a plurality of users identified as interacting with the computing system.

At 906, the method 900 may include selecting a first voice command from a set of voice commands based on a user identity of the user while the first user is the controlling user.

At 908, the method 900 may include identifying a first voice-command suggestion corresponding to the selected voice command.

At 910, the method 900 may include presenting via a display a graphical user interface including the first voice-command suggestion.

At 912, the method 900 may include recognizing a second user as the controlling user.

At 914, the method 900 may include selecting a second voice command from the set of voice commands based on a user identity of the second user while the second user is the controlling user. The second voice command may differ from the first voice command.

At 916, the method 900 may include identifying a second voice-command suggestion corresponding to the second selected voice command.

At 918, the method 900 may include presenting via the display the graphical user interface including the second voice-command suggestion. The second voice-command suggestion may differ from the first voice-command suggestion.

Different users may have different preferences, tendencies, skills, and knowledge of voice commands. Accordingly, by personalizing voice-command suggestions presented to a user, the user may be more likely to provide voice input as desired. Moreover, by dynamically changing the voice-command suggestions presented in the graphical as the controlling user changes, the voice-command suggestions may be tuned to the individual characteristics of the controlling user.

Figure 10:
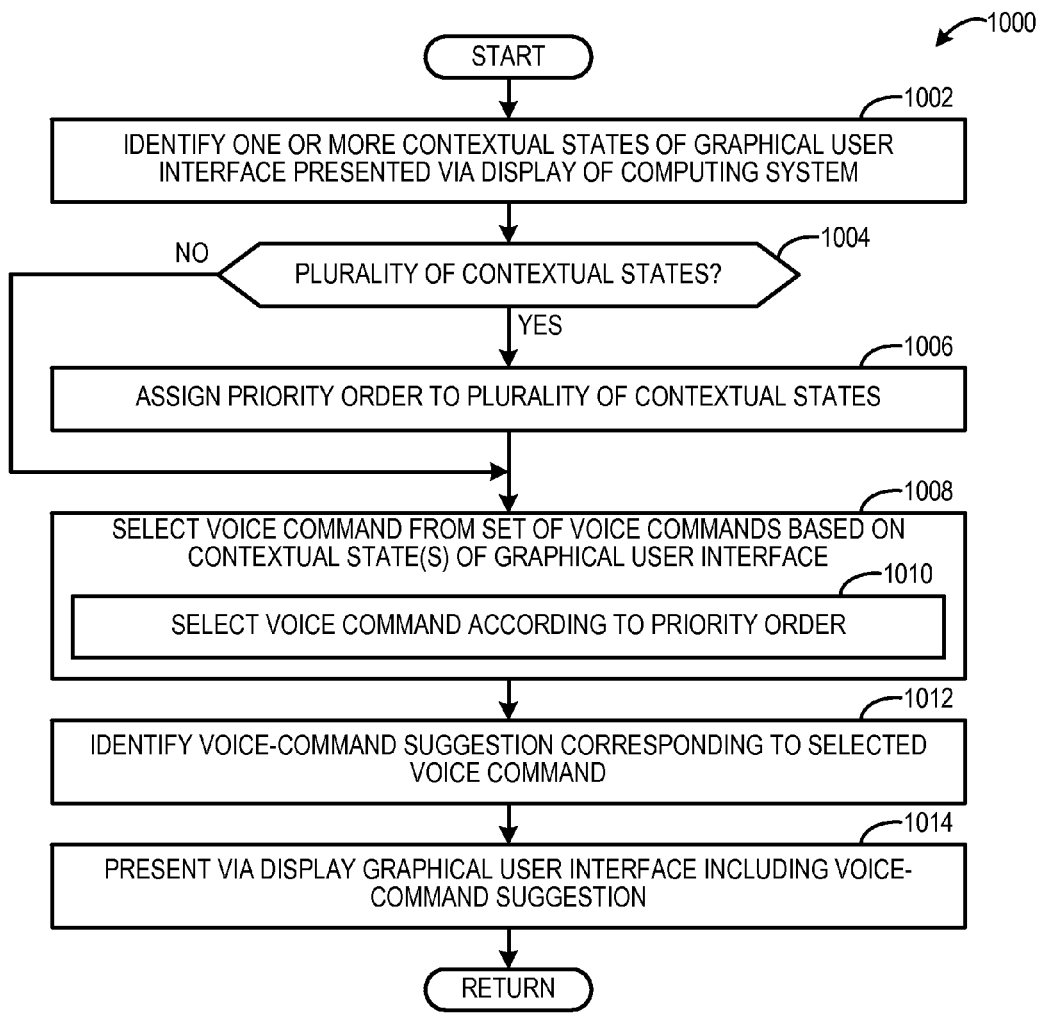
FIG. 10 shows an example method for presenting context-specific voice-command suggestions.

FIG. 10 shows an example method 1000 for presenting context-specific voice-command suggestions. For example, the method 1000 may be performed by the computing system 102 shown in FIG. 1 or the computing system 1400 shown in FIG. 14.

At 1002, the method 1000 may include identifying one or more contextual states of a graphical user interface presented via a display of the computing system.

At 1004, the method 1000 may include determining whether the graphical user interface or the computing system is operating in a plurality of identified contextual states. If the graphical user interface or the computing system is operating in a plurality of identified contextual states, then the method 1000 moves to 1006. Otherwise, the method 1000 moves to 1008.

At 1006, the method 1000 may include assigning a priority order to the plurality of identified contextual states.

At 1008, the method 1000 may include selecting a voice command from a set of voice commands based on the contextual state of the graphical user interface. In cases where the graphical user interface or the computing system is operating in a plurality of identified contextual states, at 1010, the method 1000 optionally may include selecting a voice command from a set of voice commands according to the priority order of the plurality of identified contextual states.

At 1012, the method 1000 may include identifying a context-specific voice-command suggestion corresponding to the selected voice command.

At 1014, the method 1000 may include presenting via a display a graphical user interface including the context-specific voice-command suggestion.

By presenting voice command suggestions that are context-specific, such voice-command suggestions may be more likely to be applicable to current operations of the computing system, and thus more likely to be used by a user interacting with the computing system.

Figure 11:
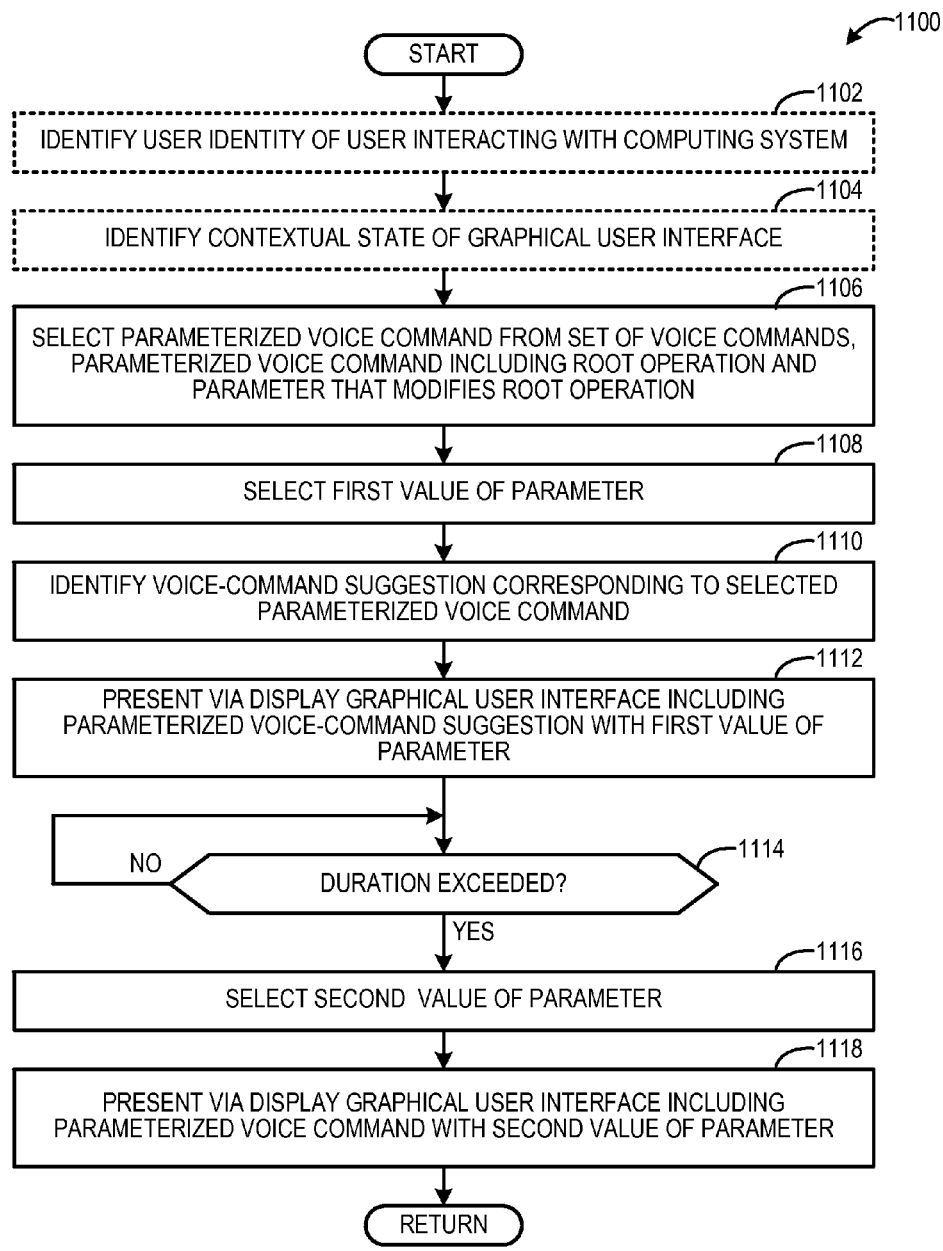
FIG. 11 shows an example method for presenting parameterized voice-command suggestions.

FIG. 11 shows an example method 1100 for presenting parameterized voice-command suggestions. For example, the method 1100 may be performed by the computing system 102 shown in FIG. 1 or the computing system 1400 shown in FIG. 14.

At 1102, the method 1100 optionally may include identifying a user identity of a user interacting with the computing system.

At 1104, the method 1100 optionally may include identifying a contextual state of a graphical user interface presented via a display of the computing system.

At 1106, the method 1100 may include selecting a parameterized voice command from a set of voice commands. The parameterized voice command may include a root operation and a parameter that modifies the root operation. The parameterized voice command may be selected in any suitable manner. For example, the parameterized voice command may be selected based on the identified user identity, the identified contextual state, a combination thereof, or other selection criteria.

At 1108, the method 1100 may include selecting a first value of the parameter of a parameterized voice-command suggestion corresponding to the selected parameterized voice command. The first value may be selected in any suitable manner. For example, the first value of the parameter may be a personalized value selected based on the identified user identity. As another example, the first value of the parameter may be a context-specific value selected based on the identified contextual state.

At 1110, the method 1100 may include identifying a voice-command suggestion corresponding to the selected parameterized voice command.

At 1112, the method 1100 may include presenting via a display a graphical user interface including the voice-command suggestion with the first value of the parameter.

At 1114, the method 1100 may include determining whether a duration has been exceeded. For example, the duration may be a predetermined duration from when the parameterized voice-command suggestion is presented. If the duration has been exceeded, then the method 1100 moves to 1116. Otherwise, the method 1100 returns to 1114.

At 1116, the method 1100 may include selecting a second value of the parameter. The second value may be selected in any suitable manner as described above.

At 1118, the method 1100 may include presenting via the display the graphical user interface including the voice-command suggestion with the second value of the parameter.

By intelligently selecting the value of the parameter and dynamically changing the value of the parameter, suitable examples of the parameterized voice-command suggestion may be more likely to be presented to a user to aid the user in identifying a desired voice command.

Figure 12:
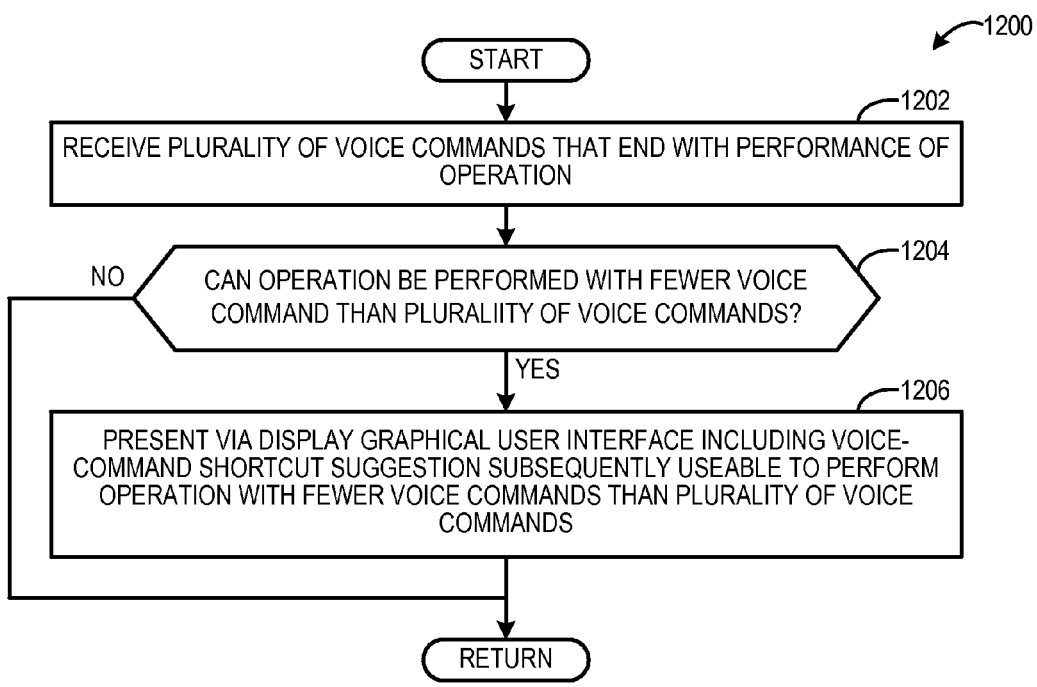
FIG. 12 shows an example method for presenting a voice-command shortcut suggestion.

FIG. 12 shows an example method 1200 for presenting a voice-command shortcut suggestion. For example, the method 1200 may be performed by the computing system 102 shown in FIG. 1 or the computing system 1400 shown in FIG. 14.

At 1202, the method 1200 may include receiving a plurality of voice commands that end with performance of an operation.

At 1204, the method 1200 may include determining whether the operation could have been performed using fewer voice commands than the plurality of voice commands. If the operation could have been performed using fewer voice commands than the plurality of voice commands, then the method 1200 moves to 1206. Otherwise, the method 1200 returns to other operations.

At 1206, the method 1200 may include presenting via a display a voice-command shortcut suggestion subsequently useable to perform the operation with fewer voice commands than the plurality of voice commands.

By suggesting voice commands that replace longer alternative processes previously carried out by the user, inefficiencies detected in how the user is accomplishing a task may be corrected.

Figure 13:
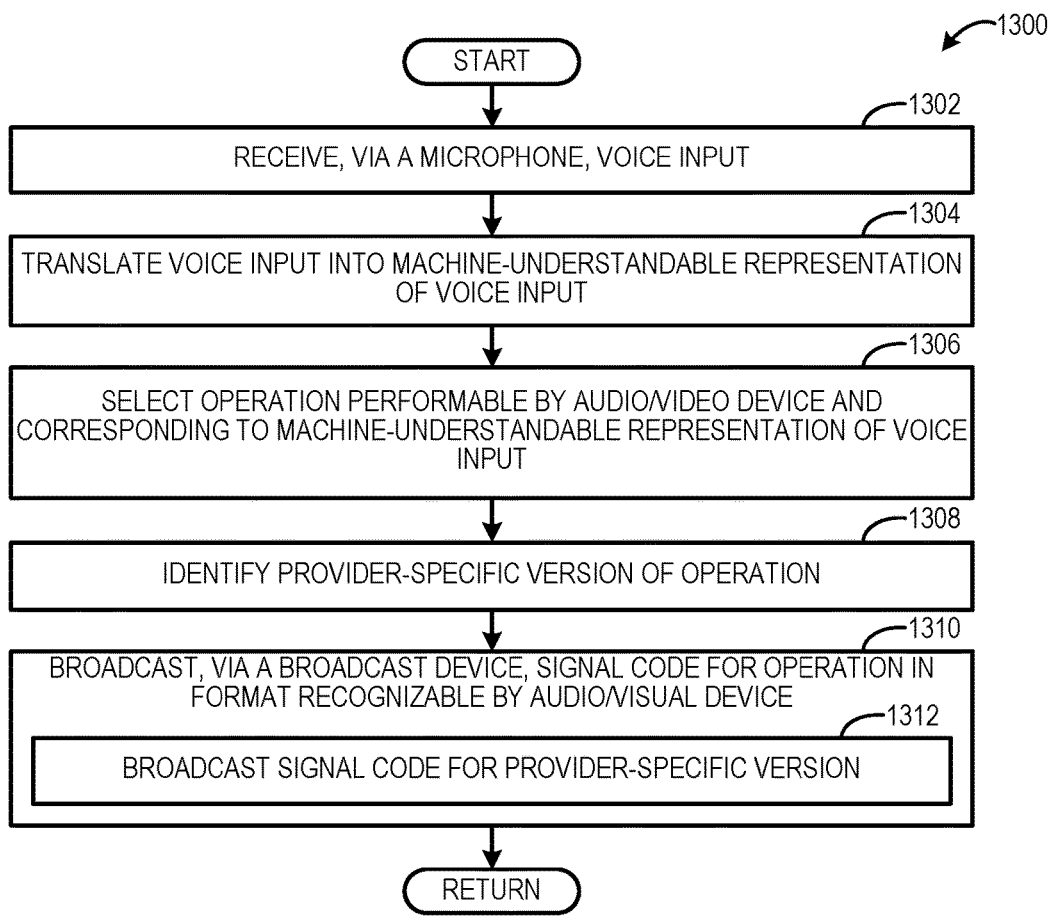
FIG. 13 shows an example method for controlling audio/video (A/V) devices based on voice input.

FIG. 13 shows an example method 1300 for controlling audio/video (A/V) devices based on voice input. For example, the method 1300 may be performed by the computing system 102 shown in FIG. 1 or the computing system 1400 shown in FIG. 14.

At 1302, the method 1300 may include receiving, via a microphone, voice input.

At 1304, the method 1300 may include translating the voice input into a machine-understandable representation of the voice input.

At 1306, the method 1300 may include selecting an operation performable by an audio/video device and corresponding to the machine-understandable representation of the voice input. In cases where the machine-understandable representation corresponds to a plurality of candidate operations, selection of the operation may be incorporated into disambiguating the operation from the plurality of candidate operations.

In some case, the operation may be performed differently based on a content provide that provides content to the audio/video device. Accordingly, in such cases, at 1308, the method 1300 optionally may include identifying a provider-specific version of the operation.

At 1310, the method 1300 may include broadcasting, via a broadcast device, a signal code for the operation in a format recognizable by the audio/video device. In cases, where the operation is a provider-specific version, at 1312, the method 1300 optionally may include broadcasting, via a broadcast device, a signal code for the provider-specific version of the operation in a format recognizable by the audio/video device.

In some implementations, the signal code may be received from a remote online service computing device responsive to a request made based on selection of the operation. In other words, the signal code may be dynamically received responsive to each such voice input. In other implementations, the signal code may be received from a remote online service computing device and stored locally on the computing system prior to selection of the operation. For example, an initialization operation may be performed to download a signal code database to the computing system.

By using the computing system to receive voice input and translate the voice input into appropriate operations, a uniform set of voice commands may be used to control a wide range of media functions that involve third-party A/V devices in an entertainment environment.

In some implementations, the above described approaches may be tied to a computing system including one or more computers. In particular, the approaches described herein may be implemented as a computer application, computer service, computer API, computer library, and/or other computer program product.

Figure 14:
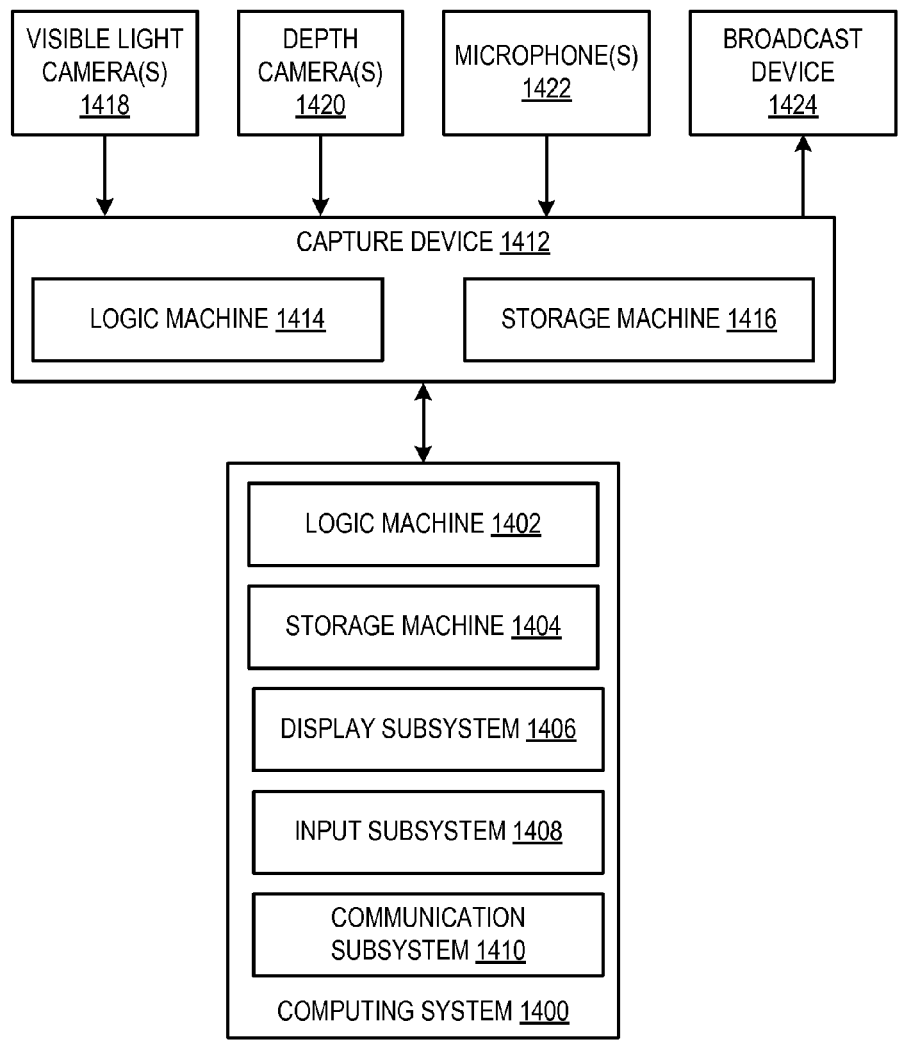
FIG. 14 shows an example computing system.

FIG. 14 schematically shows a non-limiting implementation of a computing system 1400 that may be coupled to a capture device 1412. Computing system 1400 is one non-limiting example of computing system 102. Computing system 1400 is shown in simplified form. It will be understood that virtually any computer architecture may be used without departing from the scope of this disclosure. In different implementations, computing system 1400 may take the form of a mainframe computer, server computer, desktop computer, laptop computer, tablet computer, home-entertainment computer, network computing device, gaming device, mobile computing device, mobile communication device (e.g., smart phone), etc.

Computing system 1400 includes a logic machine 1402 and a storage machine 1404. Computing system 1400 may optionally include a display subsystem 1406, input subsystem 1408, communication subsystem 1410, and/or other components not shown in FIG. 14.

Logic machine 1402 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1404 includes one or more physical devices configured to hold instructions executable by the logic machine to implement the methods and processes described herein. When such methods and processes are implemented, the state of storage machine 1404 may be transformed—e.g., to hold different data.

Storage machine 1404 may include removable and/or built-in devices. Storage machine 1404 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1404 may include volatile, nonvolatile, dynamic, static, read/write, read-only, random-access, sequential-access, location-addressable, file-addressable, and/or content-addressable devices.

It will be appreciated that storage machine 1404 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1402 and storage machine 1404 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1400 implemented to perform a particular function. In some cases, a module, program, or engine may be instantiated via logic machine 1402 executing instructions held by storage machine 1404. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1406 may be used to present a visual representation of data held by storage machine 1404. This visual representation may take the form of a graphical user interface (GUI). As the herein described methods and processes change the data held by the storage machine, and thus transform the state of the storage machine, the state of display subsystem 1406 may likewise be transformed to visually represent changes in the underlying data. Display subsystem 1406 may include one or more display devices utilizing virtually any type of technology. Such display devices may be combined with logic machine 1402 and/or storage machine 1404 in a shared enclosure, or such display devices may be peripheral display devices.

When included, input subsystem 1408 may comprise or interface with one or more user-input devices such as a keyboard, mouse, touch screen, or game controller. In some implementations, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1410 may be configured to communicatively couple computing system 1400 with one or more other computing devices. Communication subsystem 1410 may include wired and/or wireless communication devices compatible with one or more different communication protocols. As non-limiting examples, the communication subsystem may be configured for communication via a wireless telephone network, or a wired or wireless local- or wide-area network. In some implementations, the communication subsystem may allow computing system 1400 to send and/or receive messages to and/or from other devices via a network such as the Internet.

Capture device 1412 may be configured to provide sensor data indicative of natural user input to computing system 1400. More particularly, capture device may include a depth camera 1420 configured to generate depth information about an object based upon image information generated by an image sensor from detected illumination light and to output the depth information to the computing device 1400. To this end, capture device 1412 includes a logic machine 1414 and a storage machine 1416. To detect the user input, the capture device 1412 receives low-level input (e.g., signal) from an array of sensory components, which may include one or more visible light cameras 1418, depth cameras 1420, and microphones 1422. Other example componentry included in the capture device may include one or more infrared or stereoscopic cameras; a head tracker, eye tracker, accelerometer, and/or gyroscope for motion detection and/or intent recognition; as well as electric-field sensing componentry for assessing brain activity. In some implementations, the capture device may comprise or interface with one or more user-input devices such as a keyboard, mouse, touch screen, or game controller. Furthermore, capture device 1412 may include a broadcast device 1424 configured to broadcast signals to different A/V devices. In one example, the broadcast device includes an infrared broadcast device configured to broadcast infrared signals to the audio/video device. In another example, the broadcast device includes a local-area network broadcast device configured to broadcast wired or wireless signals to the audio/video device. In another example, the broadcast device includes a consumer electronic control broadcast device configured to broadcast consumer electronic control signals to the audio/video device via high-definition multimedia interface links.

Capture device 1412 may processes low-level input from the sensory components to yield an actionable, high-level input to computing system 1400. Such action may generate corresponding user input or other high-level commands, which are received in computing system 1400. In some implementations, capture device 1412 and sensory componentry may be integrated together, at least in part. In other implementations, the capture device may be integrated with the computing system and receive low-level input from peripheral sensory components.

An example provides, on a computing system, a method for suggesting voice commands to control user interaction with the computing system, the method comprising identifying a user identity of a user interacting with the computing system, selecting a voice command from a set of voice commands based on the user identity, identifying a voice-command suggestion corresponding to the voice command, and presenting, via a display, a graphical user interface including the voice-command suggestion. In such an example, voice commands that have previously been successfully employed by the user optionally are associated with the user identity, and a voice command that has not previously been successfully employed by the user optionally is selected as the voice command. In such an example, applications of the computing system previously used by the user optionally are associated with the user identity, and a voice command for controlling an application that has been used by the user optionally is selected as the voice command. In such an example, voice commands corresponding to voice-command suggestions that have previously been presented to the user optionally are associated with the user identity, and voice-command suggestions that have been previously presented to the user and ignored by the user optionally are omitted from being selected as the voice command for a designated period. In such an example, the method optionally further comprises receiving via user input a request for voice-command suggestions, and the voice-command suggestion optionally is presented in a voice-command suggestion overlay positioned in front of a currently displayed user interface in response to receiving the request. In such an example, the method optionally further comprises identifying a contextual state of the graphical user interface, and the voice command optionally is selected from a context-specific subset of the set of voice commands, the context-specific subset including voice commands for controlling operation of the computing system in the contextual state. In such an example, the contextual state optionally includes one or more of a music state, a video state, a gameplay state, and a communication state. In such an example, identifying the contextual state of the graphical user interface optionally includes identifying a plurality of contextual states, and the method optionally further comprises assigning a priority order to the plurality of contextual states, and the voice command optionally is selected according to the priority order. In such an example, the voice command optionally includes a parameterized voice command including a root operation and a parameter that modifies the root operation, and the method optionally further comprises selecting a personalized value of the parameter based on the user identity, and presenting via the display a voice-command suggestion with the personalized value of the parameter. In such an example, the personalized value of the parameter optionally is a first personalized value, and the method optionally further comprises in response to exceeding a duration, selecting a second personalized value of the parameter based on the user identity, the second personalized value differing from the first personalized value, and presenting the parameterized voice-command suggestion with the second personalized value. Any or all of the above-described examples may be combined in any suitable manner in various implementations.

Another example provides a computing system, comprising a logic machine, and a storage machine holding instructions executable by the logic machine to recognize a first user of a plurality of users interacting with the computing system as a controlling user ready to provide voice input, select a voice command from a set of voice commands based on a user identity of the first user while the first user is the controlling user, identify a voice-command suggestion corresponding to the selected voice command, and present via a display a graphical user interface including the voice-command suggestion. In such an example, optionally the voice command is a first voice command, the voice-command suggestion optionally is a first voice-command suggestion, and the storage machine optionally further holds instructions executable by the logic machine to recognize a second user of the plurality of users as the controlling user, select a second voice command from the set of voice commands based on a user identity of the second user while the second user is the controlling user, the second voice command differing from the first voice command, identify a second voice-command suggestion corresponding to the second selected voice command, and present via the display the graphical user interface including the second voice-command suggestion, the second voice-command suggestion differing from the first voice-command suggestion. In such an example, the first voice-command suggestion optionally is presented with a first visual indication that the first voice-command suggestion applies to the first user, and the second voice-command suggestion optionally is presented with a second visual indication that the second voice-command suggestion applies to the second user, the first visual indication differing from the second visual indication. In such an example, the storage machine optionally further holds instructions executable by the logic machine to identify a contextual state of the graphical user interface, and wherein the voice command optionally is selected from a context-specific subset of the set of voice commands, the context-specific subset including voice commands for controlling operation of the computing system in the contextual state. In such an example, the contextual state optionally includes one or more of a music state, a video state, a gameplay state, and a communication state. In such an example, identifying the contextual state of the graphical user interface optionally includes identifying a plurality of contextual states, and wherein the storage machine optionally further holds instructions executable by the logic machine to assign a priority order to the plurality of contextual states, and wherein the voice command optionally is selected according to the priority order. Any or all of the above-described examples may be combined in any suitable manner in various implementations.

Another example provides a computing system, comprising a logic machine, and a storage machine holding instructions executable by the logic machine to identify a user identity of a user interacting with the computing system, select a parameterized voice command from a set of voice commands based on the user identity, the parameterized voice command including a root operation and a parameter that modifies the root operation, select a personalized value of the parameter based on the user identity, identify a parameterized voice-command suggestion corresponding to the selected parameterized voice command, and present via a display a graphical user interface including the parameterized voice-command suggestion with the personalized value of the parameter. In such an example, the personalized value of the parameter optionally is a first personalized value, and wherein the storage machine optionally further holds instructions executable by the logic machine to in response to exceeding a duration, select a second personalized value of the parameter based on the user identity, the second personalized value differing from the first personalized value, and present via the display the parameterized voice-command suggestion with the second personalized value of the parameter. In such an example, the personalized value of the parameter optionally is a first personalized value selected based on a first user identity of a first user, and wherein the storage machine optionally further holds instructions executable by the logic machine to identify a plurality of user identities of users interacting with the computing system, in response to exceeding a duration, select a second personalized value of the parameter based on a second user identity of a second user of the plurality of users, the second personalized value differing from the first personalized value, and present via the display the parameterized voice-command suggestion with the second personalized value of the parameter. In such an example, the storage machine optionally further holds instructions executable by the logic machine to identify a contextual state of the graphical user interface, and wherein the parameterized voice command is selected from a context-specific subset of the set of voice commands, the context-specific subset including voice commands for controlling operation of the computing system in the contextual state. Any or all of the above-described examples may be combined in any suitable manner in various implementations.

Another example provides, on a computing system, a method for suggesting voice commands to control user interaction with the computing system, the method comprising identifying a contextual state of a graphical user interface presented via a display of the computing system, selecting a voice command from a set of voice commands based on the contextual state of the graphical user interface, identifying a context-specific voice-command suggestion corresponding to the selected voice command, and presenting via a display a graphical user interface including the context-specific voice-command suggestion. In such an example, the contextual state optionally includes one or more of a music state, a video state, a gameplay state, and a communication state. In such an example identifying a contextual state of the graphical user interface optionally includes identifying a plurality of contextual states, and the method optionally further comprises assigning a priority order to the plurality of contextual states, and wherein the voice command is selected according to the priority order. In such an example, a first contextual state of the plurality of contextual states that currently has focus over the other of the plurality of contextual states optionally is assigned a highest priority of the priority order. In such an example, a plurality of voice commands optionally are selected for presentation as context-specific voice-command suggestions, and a selected number of context-specific voice-command suggestions corresponding to a first contextual state having a first priority optionally is greater than a selected number of context-specific voice-command suggestions corresponding to a second contextual state having a second priority that is lower than the first priority. In such an example, context-specific voice-command suggestions corresponding to a first contextual state optionally are presented with a first visual indication, and wherein context-specific voice-command suggestions corresponding to a second contextual state are presented with a second visual indication different than the first visual indication. In such an example, the method optionally further comprises identifying a user identity of a user interacting with the computing system, and wherein the voice command optionally is selected from the set of voice commands based on the user identity and the contextual state. In such an example, voice commands corresponding to the contextual state that have previously been successfully employed by the user optionally are associated with the user identity, and wherein a voice command corresponding to the contextual state that has not previously been successfully employed by the user optionally is selected as the voice command. In such an example, context-specific voice-command suggestions that have previously been presented to the user optionally are associated with the user identity, and wherein context-specific voice-command suggestions that have been previously presented to the user and ignored by the user optionally are omitted from being selected as the voice command for a designated period. In such an example, the voice command optionally is a parameterized voice command including a root operation and a parameter that modifies the root operation, and the method optionally further comprises selecting a context-specific value of the parameter based on the contextual state, and presenting via the display the graphical user interface including a parameterized context-specific voice-command suggestion with the context-specific value of the parameter. In such an example, the context-specific value optionally is a first context-specific value, and the method optionally further comprises in response to exceeding a duration, selecting a second context-specific value of the parameter based on the contextual state, the second context-specific value being different than the first context-specific value, and presenting via the display the parameterized context-specific voice-command suggestion with the second context-specific value of the parameter. Any or all of the above-described examples may be combined in any suitable manner in various implementations.

Another example provides a computing system, comprising a logic machine; and a storage machine holding instruction executable by the logic machine to select a parameterized voice command from a set of voice commands, the parameterized voice command including a root operation and a parameter that modifies the root operation, identify a parameterized voice-command suggestion corresponding to the selected parameterized voice command, and present via a display a graphical user interface including the parameterized voice-command suggestion with a first value of the parameter, in response to exceeding a duration, present via the display the graphical user interface including the parameterized voice-command suggestion with a second value of the parameter that differs from the first value of the parameter. In such an example, the storage machine optionally further holds instructions executable by the logic machine to identify a user identity of a user interacting with the computing system, select the first value of the parameter based on the user identity, and select the second value of the parameter based on the user identity. In such an example, the storage machine optionally further holds instructions executable by the logic machine to identify a plurality of user identities corresponding to a plurality of users interacting with the computing system, select the first value of the parameter based on a first user identity of the plurality of user identities, and select the second value of the parameter based a second user identity of the plurality of user identities, the first user identity differing from the second user identity. In such an example, the storage machine optionally further holds instructions executable by the logic machine to identify a contextual state of the graphical user interface, select the first value of the parameter based on the contextual state, and select the second value of the parameter based on the contextual state. In such an example, the storage machine optionally further holds instructions executable by the logic machine to identify a plurality of applications installed on the computing system, select the first value of the parameter based on a first application of the plurality of applications, and select the second value of the parameter based on a second application of the plurality of applications, the first application differing from the second application. Any or all of the above-described examples may be combined in any suitable manner in various implementations.

Another example provides a computing system, comprising a logic machine; and a storage machine holding instruction executable by the logic machine to receive a plurality of voice commands that end with performance of an operation, and present via a display a voice-command shortcut suggestion subsequently useable to perform the operation with fewer voice commands than the plurality of voice commands. In such an example, the plurality of voice commands optionally include a plurality of user interface navigation operations that navigate from a starting user-interface location, through one or more intermediate user-interface locations, and to an ending user-interface location, and the voice-command shortcut suggestion optionally corresponds to a voice command that navigates from the starting user-interface location directly to the ending user-interface location. In such an example, the plurality of voice commands optionally include a plurality of user interface navigation operations that navigate to a virtual storefront, the operation optionally includes installing on the computing system a first media content item purchased from the virtual storefront, and the voice-command shortcut suggestion optionally corresponds to a voice command to purchase a second media content item directly without navigating to the virtual storefront. In such an example, the storage machine optionally further holds instructions executable by the logic machine to identify a user identity of a user interacting with the computing system, and wherein the second media content item is selected based on the user identity. Any or all of the above-described examples may be combined in any suitable manner in various implementations.

Another example provides, on a computing system, a method comprising receiving, via a microphone, voice input, translating the voice input into a machine-understandable representation of the voice input, selecting an operation performable by an audio/video device and corresponding to the machine-understandable representation of the voice input, and broadcasting, via a broadcast device, a signal code for the operation in a format recognizable by the audio/video device. In such an example, the broadcast device optionally includes an infrared broadcast device configured to broadcast infrared signals to the audio/video device. In such an example, the broadcast device optionally includes a local-area network broadcast device configured to broadcast wired or wireless signals to the audio/video device. In such an example, the broadcast device optionally includes a consumer electronic control broadcast device configured to broadcast consumer electronic control signals to the audio/video device via high-definition multimedia interface links. In such an example, the operation optionally is a macro operation, and the signal code is one of a plurality of signal codes, each of the plurality of signal codes being broadcast in a format recognizable by a different audio/video device. In such an example, the operation optionally is a macro operation, and the signal code is one of a plurality of signal codes, each of the plurality of signal codes being consecutively broadcast in the format recognizable by the audio/video device. In such an example, the signal code optionally is derived from a program guide corresponding to the audio/video device. In such an example, the program guide optionally is received from a remote online service computing device prior to selection of the operation. Any or all of the above-described examples may be combined in any suitable manner in various implementations.

Another example, provides a computing system, comprising a logic machine, and a storage machine holding instructions executable by the logic machine to receive, via a microphone, voice input, translate the voice input into a machine-understandable representation of the voice input, select an operation performable by an audio/video device and corresponding to the machine-understandable representation of the voice input, and broadcast, via a broadcast device, a signal code for the operation in a format recognizable by the audio/video device. In such an example, the broadcast device optionally includes an infrared broadcast device configured to broadcast infrared signals to the audio/video device. In such an example, the broadcast device optionally includes a local-area network broadcast device configured to broadcast wired or wireless signals to the audio/video device. In such an example, the broadcast device optionally includes a consumer electronic control broadcast device configured to broadcast consumer electronic control signals to the audio/video device via high-definition multimedia interface links. In such an example, the operation optionally is a macro operation, and the signal code is one of a plurality of signal codes, each of the plurality of signal codes being broadcast in a format recognizable by a different audio/video device. In such an example, the operation optionally is a macro operation, and the signal code is one of a plurality of signal codes, each of the plurality of signal codes being consecutively broadcast in the format recognizable by the audio/video device. In such an example, the signal code optionally is received from a remote online service computing device responsive to a request made based on selection of the operation. In such an example, the signal code optionally is received from a remote online service computing device and stored locally on the computing system prior to selection of the operation. Any or all of the above-described examples may be combined in any suitable manner in various implementations.

Another example provides, on a computing system, a method comprising receiving, via a microphone, voice input, translating the voice input into a machine-understandable representation of the voice input, selecting an operation performable by an audio/video device and corresponding to the machine-understandable representation of the voice input, identifying a provider-specific version of the operation, and broadcasting, via a broadcast device, a signal code for the provider-specific version of the operation in a format recognizable by the audio/video device. In such an example, the signal code optionally is received from a remote online service computing device responsive to a request made based on selection of the operation. In such an example, the signal code optionally is received from a remote online service computing device and stored locally on the computing system prior to selection of the operation. In such an example, the operation optionally includes presenting, via a presentation device, a content channel, and identifying the provider-specific version of the operation includes requesting a provider-specific identifier of the content channel from a content provider of the content channel. Any or all of the above-described examples may be combined in any suitable manner in various implementations.

It will be understood that the configurations and/or approaches described herein are exemplary in nature, and that these specific implementations or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. On a computing system, a method for suggesting voice commands to control user interaction with the computing system, the method comprising:
 identifying a contextual state of a graphical user interface presented via a display of the computing system;
 selecting a parameterized voice command from a set of voice commands based on the contextual state of the graphical user interface, the parameterized voice command including a root operation and a parameter that modifies the root operation;
 selecting a first context-specific value of the parameter based on the contextual state;
 identifying a context-specific voice-command suggestion corresponding to the selected parameterized voice command and the selected first context-specific value of the parameter;
 presenting via a display a graphical user interface including the context-specific voice-command suggestion with the first context-specific value of the parameter;
 in response to exceeding a duration, selecting a second context-specific value of the parameter based on the contextual state, the second context-specific value being different than the first context-specific value; and
 presenting via the display the parameterized context-specific voice-command suggestion with the second context-specific value of the parameter.

2. The method of claim 1, wherein the contextual state includes one or more of a music state, a video state, a gameplay state, and a communication state.

3. The method of claim 1, wherein identifying a contextual state of the graphical user interface includes identifying a plurality of contextual states, and the method further comprises:
 assigning a priority order to the plurality of contextual states; and
 wherein the parameterized voice command is selected according to the priority order.

4. The method of claim 3, wherein a first contextual state of the plurality of contextual states that currently has focus over the other of the plurality of contextual states is assigned a highest priority of the priority order.

5. The method of claim 3, wherein a plurality of voice commands are selected for presentation as context-specific voice-command suggestions, and wherein a selected number of context-specific voice-command suggestions corresponding to a first contextual state having a first priority is greater than a selected number of context-specific voice-command suggestions corresponding to a second contextual state having a second priority that is lower than the first priority.

6. The method of claim 5, wherein context-specific voice-command suggestions corresponding to a first contextual state are presented with a first visual indication, and wherein context-specific voice-command suggestions corresponding to a second contextual state are presented with a second visual indication different than the first visual indication.

7. The method of claim 1, further comprising:
identifying a user identity of a user interacting with the computing system; and
wherein the parameterized voice command is selected from the set of voice commands based on the user identity and the contextual state.

8. The method of claim 7, wherein voice commands corresponding to the contextual state that have previously been successfully employed by the user are associated with the user identity, and wherein a voice command corresponding to the contextual state that has not previously been successfully employed by the user is selected as the parameterized voice command.

9. The method of claim 1, wherein context-specific voice-command suggestions that have previously been presented to the user are associated with the user identity, and wherein context-specific voice-command suggestions that have been previously presented to the user and ignored by the user are omitted from being selected as the parameterized voice command for a designated period.

10. A computing system, comprising:
a logic machine; and
a storage machine holding instruction executable by the logic machine to:
select a parameterized voice command from a set of voice commands, the parameterized voice command including a root operation and a parameter that modifies the root operation;
identify a parameterized voice-command suggestion corresponding to the selected parameterized voice command; and
present via a display a graphical user interface including the parameterized voice-command suggestion with a first value of the parameter;
in response to exceeding a duration, present via the display the graphical user interface including the parameterized voice-command suggestion with a second value of the parameter that differs from the first value of the parameter.

11. The computing system of claim 10, wherein the storage machine further holds instructions executable by the logic machine to:
identify a user identity of a user interacting with the computing system;

select the first value of the parameter based on the user identity; and
select the second value of the parameter based on the user identity.

12. The computing system of claim 10, wherein the storage machine further holds instructions executable by the logic machine to:
identify a plurality of user identities corresponding to a plurality of users interacting with the computing system;
select the first value of the parameter based on a first user identity of the plurality of user identities; and
select the second value of the parameter based a second user identity of the plurality of user identities, the first user identity differing from the second user identity.

13. The computing system of claim 10, wherein the storage machine further holds instructions executable by the logic machine to:
identify a contextual state of the graphical user interface;
select the first value of the parameter based on the contextual state; and
select the second value of the parameter based on the contextual state.

14. The computing system of claim 10, wherein the storage machine further holds instructions executable by the logic machine to:
identify a plurality of applications installed on the computing system;
select the first value of the parameter based on a first application of the plurality of applications; and
select the second value of the parameter based on a second application of the plurality of applications, the first application differing from the second application.

15. A computing system, comprising:
a logic machine; and
a storage machine holding instruction executable by the logic machine to:
receive a plurality of voice commands that end with performance of an operation, wherein the plurality of voice commands include a plurality of user interface navigation operations that navigate to a virtual storefront, and wherein the operation includes installing on the computing system a first media content item purchased from the virtual storefront; and
after receiving the plurality of voice commands, present via a display a voice-command shortcut suggestion subsequently useable to perform the operation with fewer voice commands than the plurality of voice commands, wherein the voice-command shortcut suggestion corresponds to a voice command to purchase a second media content item directly without navigating to the virtual storefront.

16. The computing system of claim 15, wherein the storage machine further holds instructions executable by the logic machine to:
identify a user identity of a user interacting with the computing system; and
wherein the second media content item is selected based on the user identity.

* * * * *